(12) United States Patent
Liao

(10) Patent No.: US 12,473,726 B2
(45) Date of Patent: Nov. 18, 2025

(54) DESCALING DEVICE, SYSTEM, AND DESCALING METHOD OF ELECTRONIC TOILET AND LIQUID SUPPLY DEVICE, SYSTEM, AND CLEANING METHOD OF ELECTRONIC TOILET

(71) Applicant: Shanghai Kohler Electronics, Ltd., Shanghai (CN)

(72) Inventor: Desheng Liao, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 394 days.

(21) Appl. No.: 17/984,854

(22) Filed: Nov. 10, 2022

(65) Prior Publication Data
US 2023/0125224 A1 Apr. 27, 2023

Related U.S. Application Data

(62) Division of application No. 17/121,209, filed on Dec. 14, 2020, now Pat. No. 11,525,252.

(30) Foreign Application Priority Data

Dec. 26, 2019 (CN) .......... 201911369399.X
Dec. 31, 2019 (CN) .......... 201911415317.0

(51) Int. Cl.
*E03D 9/03* (2006.01)
*E03D 9/00* (2006.01)
*E03D 9/02* (2006.01)

(52) U.S. Cl.
CPC .............. *E03D 9/03* (2013.01); *E03D 9/002* (2013.01); *E03D 2009/028* (2013.01)

(58) Field of Classification Search
CPC ....... E03D 2009/028; E03D 9/02; E03D 9/03; E03D 9/031–032
See application file for complete search history.

(56) References Cited

U.S. PATENT DOCUMENTS 4,873,727 A 10/1989 Homan
5,404,594 A 4/1995 Ring et al.
(Continued)

FOREIGN PATENT DOCUMENTS

CN 1822870 A 8/2006
CN 1909957 A 2/2007
(Continued)

OTHER PUBLICATIONS

Chinese Office Action for Chinese Application No. CN201911369399.X dated Aug. 24, 2020.
(Continued)

*Primary Examiner* — David P Angwin
*Assistant Examiner* — Nicholas A Ros
(74) *Attorney, Agent, or Firm* — Lempia Summerfield Katz LLC

(57) ABSTRACT

The present disclosure discloses a liquid supply device, a system, and a cleaning method for an electronic toilet. The liquid supply device includes a detergent storage box, a piston assembly, and a driving mechanism. The detergent storage box includes a detergent space for containing a detergent and a piston space for containing the piston assembly. The water inlet end is provided with a water inlet end check valve. The detergent saturated solution output end is provided with an output end check valve. The piston assembly is internally provided with a piston rod driven by the driving mechanism to reciprocate in the piston space. The reciprocating movement of the piston rod in the piston space controls the opening or closing of the water inlet end check valve and the output end check valve.

16 Claims, 24 Drawing Sheets

(56) References Cited

U.S. PATENT DOCUMENTS

| | | | |
|---|---|---|---|
| 5,581,823 A | 12/1996 | Kuo | |
| 5,851,823 A | 12/1998 | Thomas et al. | |
| 5,881,396 A | 3/1999 | Rivera | |
| 6,256,802 B1 * | 7/2001 | Stradinger | E03D 9/02 137/565.13 |
| 2005/0241055 A1 * | 11/2005 | Mullett | E03D 9/031 4/476 |
| 2012/0073036 A1 * | 3/2012 | Rizzo | E03D 9/037 4/231 |
| 2017/0314248 A1 * | 11/2017 | Segura Martínez | E03D 9/035 |
| 2018/0044902 A1 * | 2/2018 | Geymer | E03D 9/02 |

FOREIGN PATENT DOCUMENTS

| | | | | |
|---|---|---|---|---|
| CN | 106050600 A | | 10/2016 | |
| CN | 206314305 U | | 7/2017 | |
| CN | 109701968 A | | 5/2019 | |
| CN | 109989464 A | | 7/2019 | |
| DE | 3002424 A1 | | 7/1981 | |
| FR | 2498656 | * | 7/1982 | E03D 9/031 |
| GB | 191418916 | * | 8/1915 | E03D 9/032 |
| JP | H0813586 A | | 1/1996 | |
| JP | 4517394 | * | 8/2010 | E03D 3/10 |
| WO | 03047715 A1 | | 6/2003 | |
| WO | 2012001197 A1 | | 1/2012 | |
| WO | WO2012001197 | * | 1/2012 | E03D 9/031 |

OTHER PUBLICATIONS

Chinese Office Action for Chinese Application No. CN201911415317.0 dated Aug. 18, 2020.

* cited by examiner

DESCALING DEVICE, SYSTEM, AND DESCALING METHOD OF ELECTRONIC TOILET AND LIQUID SUPPLY DEVICE, SYSTEM, AND CLEANING METHOD OF ELECTRONIC TOILET

CROSS REFERENCES TO RELATED APPLICATIONS

This application is a divisional application of co-pending U.S. patent application Ser. No. 17/121,209, filed Dec. 14, 2020, which is hereby incorporated by reference in its entirety, and which claims the benefit of priority to: Chinese Patent Application No. 201911369399. X filed in the Chinese Intellectual Property Office on Dec. 26, 2019, which is hereby incorporated by reference in its entirety; Chinese Patent Application No. 201911415317.0 filed in the Chinese Intellectual Property Office on Dec. 31, 2019, which is hereby incorporated by reference in its entirety.

FIELD

The present disclosure relates to the technical field related to bathroom equipment, in particular to a descaling device, a system, and a descaling method of an electronic toilet. The present disclosure also relates to the technical field relevant to sanitary equipment, in particular to a liquid supply device, a system and a cleaning method of an electronic toilet.

BACKGROUND

After the electronic toilet has been used for a long time, especially in areas with hard water quality, there are internal pipes and hoses inside the product through which water flows will easily accumulate scale, which will affect the performance of the product.

At present, the existing products can only be descaled by adding the descaling liquid in the product to the channels and openings, and the descaling liquid is manually supplied to the inside of the product on a regular basis. It is impossible to achieve the function of descaling multiple times automatically by adding the descaling agent at a time.

After the electronic toilet has been used for a long time, especially in areas with hard water quality, there are internal pipes and hoses inside the product through which water flows will easily accumulate scale, which will affect the performance of the product.

At present, the existing products can only be cleaned by adding or storing the detergent through the water tank inside the product and the opening to the water tank, and then using the water pump to push the detergent to flow through the internal pipes of the product, or using the original water pump inside the product to suck the detergent back to enter the water storage tank inside the product, and then letting the detergent be transported by the water pump to flow through the internal pipes of the product for cleaning. However, for most electronic toilet seats without an internal water tank and water pump on the market, the detergent cannot be automatically input into the internal pipes of the product for cleaning.

SUMMARY

Based on this, it is necessary to provide a descaling device, a system, and a descaling method of an electronic toilet in response to the technical problem that the prior art cannot achieve the function of descaling multiple times automatically by adding the descaling agent at a time.

The present disclosure provides a descaling device of an electronic toilet, the descaling device comprising: a descaling device body, a descaling device body fixing seat, an electromagnetic switch valve, an electromagnetic switch valve fixing seat, and a one-way valve;

the bottom of the descaling device body is inserted into the descaling device body fixing seat, the descaling device body fixing seat is internally provided with a body fixing seat water inlet and a descaling saturated solution outlet; the descaling device body is provided with a housing water inlet pipe, one end of the housing water inlet pipe is connected to the body fixing seat water inlet, and the other end extends into the descaling agent chamber of the descaling device body for containing the descaling agent, and the bottom of the descaling agent chamber is provided with a chamber liquid outlet; a water outlet gap is formed between the outer wall of the housing water inlet pipe and the inner chamber wall of the descaling agent chamber, the water outlet gap communicate with the chamber liquid outlet and the descaling saturated solution outlet respectively;

the electromagnetic switch valve fixing seat is provided with an electromagnetic switch valve fixing seat water inlet and a descaling mixture water outlet, the electromagnetic switch valve is arranged on the electromagnetic switch valve fixing seat and controls the electromagnetic switch valve fixing seat water inlet to be connected or disconnected with the body fixing seat water inlet; and the descaling saturated solution outlet communicates with the descaling mixture water outlet through the one-way valve.

In one embodiment, the descaling device body comprises a housing having the descaling agent chamber; the bottom of the housing is provided with an end, the end is inserted into the descaling device body fixing seat and is detachably connected to the descaling device body fixing seat; one end of the housing water inlet pipe is inserted into the descaling device body fixing seat and communicates with the body fixing seat water inlet, and the other end extends into the housing from the end.

In one embodiment, the descaling device body further comprises an isolation screen arranged on the chamber liquid outlet and sleeved on the housing water inlet pipe.

In one embodiment, the descaling device body fixing seat internally includes a water inlet chamber and a solution outlet chamber; one end of the water inlet chamber is connected with the body fixing seat water inlet, the other end is connected with the housing water inlet pipe; one end of the solution outlet chamber is connected with the descaling saturated solution outlet, the other end is connected with the water outlet gap.

In one embodiment, the diameter of the water inlet chamber is different from the diameter of the solution outlet chamber.

In one embodiment, the end of the housing water inlet pipe inserted into the descaling device body fixing seat is provided with a water inlet pipe sealing ring, the water inlet pipe sealing ring isolates the water inlet chamber and the solution outlet chamber.

In one embodiment, a three-way valve is provided in the electromagnetic switch valve fixing seat; the first passage of the three-way valve is connected with the electromagnetic switch valve fixing seat water inlet; the second passage of the three-way valve is connected with the one-way valve, the third passage of the three-way valve is connected with the descaling mixture water outlet.

The present disclosure also provides a descaling system of an electronic toilet, comprising: an electronic toilet and the descaling device as said before;

wherein the electronic toilet comprises a toilet body and the pipe contained in the toilet body, the toilet body is provided with a product water inlet switch solenoid valve for controlling the connection and disconnection with the external water supply system; the electromagnetic switch valve fixing seat water inlet of the descaling device is connected with the product water inlet, and the descaling mixture water outlet of the descaling device is connected with one end of the pipe, and the other end of the pipe is provided with a water outlet device.

The present disclosure also provides a descaling method for the descaling system of an electronic toilet as said before, comprising:

in response to a descaling start request, turning on the product water inlet switch solenoid valve, and closing the electromagnetic switch valve after the electromagnetic switch valve has turned on for a preset initialization time, and reopening electromagnetic switch valve after a preset mixing time has passed;

in response to a descaling stop request, turning off the electromagnetic switch valve and the product water inlet switch solenoid valve.

In one embodiment, the step of reopening the electromagnetic switch valve after the preset mixing time has passed specifically includes:

after the preset mixing time, opening the electromagnetic switch valve for a preset time to make the pipe full, then closing the product water inlet switch solenoid valve, and reopening the product water inlet switch solenoid valve after a preset descaling time has passed.

The descaling device provided by the present disclosure can, according to the product's instruction, after adding solid descaling agent one time, and then supplying clean water multiple times to dissolve the solid descaling agent, provide descaling agent solution to the pipe(s) of the internal components of the electronic toilet for descaling. Therefore, the problem of failure of the internal functional modules of the electronic toilet due to accumulation of scale and blockage can be solved, the service life of the components is then prolonged and the user's using experience to the product is improved. In the meanwhile, by forming the water outlet gap between the outer wall of the housing water inlet pipe and the inner chamber wall of the descaling agent chamber that is connected to the descaling saturated solution outlet, the overall volume of the descaling device is reduced.

Based on this, it is also necessary to provide a liquid supply device, a system and a cleaning method of an electronic toilet to solve the technical problem that the prior art cannot automatically add detergent to an electronic toilet seat without an internal water tank and a water pump.

The present disclosure provides a liquid supply device for an electronic toilet comprising: a detergent storage box, a piston assembly, and a driving mechanism;

the detergent storage box includes a detergent space for containing detergent and a piston space containing the piston assembly, the detergent space communicates with the piston space; the piston space includes a water inlet end arranged at the front end and a detergent saturated solution output end arranged at the rear end; the water inlet end is provided with a water inlet end check valve, the opening or closing of the water inlet end check valve controls the communication or separation of the water inlet end and the detergent space; the detergent saturated solution output end is provided with an output end check valve, the opening or closing of the output end check valve controls the connection or disconnection of the detergent saturated solution output end with the detergent space;

the piston assembly is internally provided with a piston rod driven by the driving mechanism to reciprocate in the piston space; the reciprocating movement of the piston rod in the piston space controls the opening or closing of the water inlet end check valve, the reciprocating movement of the piston rod in the piston space controls the opening or closing of the output end check valve.

In one embodiment, a liquid suction chamber is provided between the piston rod and the output end check valve; the liquid suction chamber is provided with a liquid suction chamber valve device, the opening or closing of the liquid suction chamber valve device controls the connection or separation of the liquid inlet of the liquid suction chamber and the detergent space; the opening or closing of the output end check valve controls the connection or separation of the liquid inlet of the liquid suction chamber and the detergent saturated solution output end; the reciprocating movement of the piston rod in the piston space controls the opening or closing of the liquid suction chamber valve device.

In one embodiment, the piston rod is driven by the driving mechanism to perform a water inflow action, a dissolving action, a liquid suction action and a liquid discharge action in the piston space, wherein:

the water inflow action is a movement of first stroke distance from the detergent saturated solution output end to the water inlet end, when the piston rod performs the water inflow action, the water inlet check valve is opened, the output end check valve is closed, and the liquid suction chamber valve device is closed;

the dissolving action is a movement of first stroke distance from the water inlet end to the detergent saturated solution output end; when the piston rod performs the dissolving action, the water inlet end check valve is closed, the output end check valve is closed, and the liquid suction chamber valve device is closed;

the liquid suction action is a movement of second stroke distance from the detergent saturated solution output end to the water inlet end, the second stroke distance is less than the first stroke distance; when the piston rod performs the liquid suction action, the water inlet end check valve is closed, the output end check valve is closed, and the liquid suction chamber valve device is opened;

the liquid discharge action is a movement of second stroke distance from the water inlet end to the detergent saturated solution output end, the second stroke distance is less than the first stroke distance; when the piston rod performs the liquid discharge action, the water inlet end check valve is closed, the output end check valve is opened, and the liquid suction chamber valve device is closed.

In one embodiment, the piston assembly further comprises a piston assembly sleeve; the piston assembly sleeve is internally provided with a sleeve chamber for containing the piston rod, the chamber wall of the sleeve chamber is provided with a sleeve through hole communicating with the detergent space;

the water inlet end check valve is arranged outside the sleeve chamber, the opening or closing of the water inlet end check valve controls the communication or separation of the water inlet end and the sleeve chamber;

the output end check valve is arranged outside the sleeve chamber, the opening or closing of the output end check valve controls the communication or separation of the detergent saturated solution output end and the sleeve chamber.

In one embodiment, the water inlet end check valve comprises a water inlet check valve spring arranged outside the sleeve chamber and a water inlet check valve core; one end of the water inlet check valve spring is fixed to the water inlet end, the other end is pressed against the water inlet check valve core; the water inlet check valve core includes a valve core head and a valve core rod; the water inlet check valve spring is pressed against the valve core head, the valve core rod is inserted into the sleeve chamber;

under the water inflow action, the piston rod contacts the valve core rod and drives the valve core head to open the sleeve chamber;

under the dissolving action, the liquid suction action, or the liquid discharge action, the piston rod and the valve core rod are separated, the valve core head resets and closes the sleeve chamber.

In one embodiment, the end of the piston rod close to the water inlet end check valve is arranged to accommodate the valve core rod chamber of the valve core rod, the chamber wall of the valve core rod chamber is provided with a valve core rod chamber wall through hole communicating with the sleeve through hole.

In one embodiment, the output end check valve comprises: an output end check valve spring arranged outside the liquid suction chamber, and an output end check valve core; one end of the output end check valve spring is fixed to the detergent saturated solution output end, the other end is pressed against the output end check valve core;

under the liquid discharge action, the output end check valve core opens the detergent saturated solution output end;

under the water inflow action, the dissolving action, or the liquid suction action, the output end check valve core closes the detergent saturated solution output end.

In one embodiment, the liquid suction chamber valve device comprises a liquid suction sealing heading bead and a liquid suction sealing spring; the liquid suction sealing heading ball is arranged at the liquid inlet of the liquid suction chamber; one end of the liquid suction sealing spring presses against the output end check valve, the other end presses against the liquid suction sealing heading bead;

under the liquid suction action, the liquid suction sealing heading bead opens the liquid inlet of the liquid suction chamber;

under the water inflow action, the dissolving action, or the liquid discharge action, the liquid suction sealing heading bead closes the liquid inlet of the liquid suction chamber.

In one embodiment, the liquid suction chamber valve device comprises a leather bowl sleeved on the piston rod, the bottom of the leather bowl is sleeved on the end of the piston rod close to the liquid suction chamber, the mouth of the leather bowl faces the liquid outlet of the liquid suction chamber.

In one embodiment, the detergent space and the piston space are separated by an isolation screen.

In one embodiment, the liquid supply device further comprises a side water pipe connecting the water inlet end and the detergent saturated solution output end.

In one embodiment, the detergent storage box has an upper opening communicating with the detergent space, the piston space is arranged at the bottom of the detergent space.

The present disclosure also provides an electronic toilet cleaning system comprising: an electronic toilet and the liquid supply device as mentioned previously;

the electronic toilet includes a toilet body and a pipe housed in the toilet body; the toilet body is provided with a product water inflow switch solenoid valve for controlling the connection or disconnection with the external water supply system, the water inlet end of the liquid supply device is connected to a product water inlet, the detergent saturated solution output end of the liquid supply device is connected to one end of the pipe, the other end of the pipe is provided with a water outlet device.

The present disclosure also provides a cleaning method of an electronic toilet cleaning system as mentioned previously comprising:

in response to a cleaning request, opening the product switch solenoid valve to control the driving mechanism of the liquid supply device to drive the piston rod to control the water inlet end check valve to open, and control the output end check valve to close;

after a preset water inflow period, controlling the driving mechanism to drive the piston rod to control the water inlet end check valve to close, and control the output end check valve to close;

after a preset dissolving period, controlling the driving mechanism to drive the piston rod to control the water inlet end check valve to close, and control the output end check valve to open.

The liquid supply device provided by the present disclosure controls the opening or closing of the check valve inside the liquid supply device by means of the action of the driving mechanism and the piston rod, without the need for an additional pump to push or suck, and it is suitable for most electronic toilets without internal water tank and pump. In the meanwhile, because the overall structure is compact, the size and shape of the opening can be freely defined according to the installation position and space structure of the liquid supply device for product design, without the restriction of the size and shape of the opening and the need for a complicated sealing and locking mechanism.

DETAILED DESCRIPTION

Embodiments of Descaling Device, System, and Descaling Method of Electronic Toilet The specific embodiments of the present disclosure are further described below in conjunction with the drawings.

Figure 1:
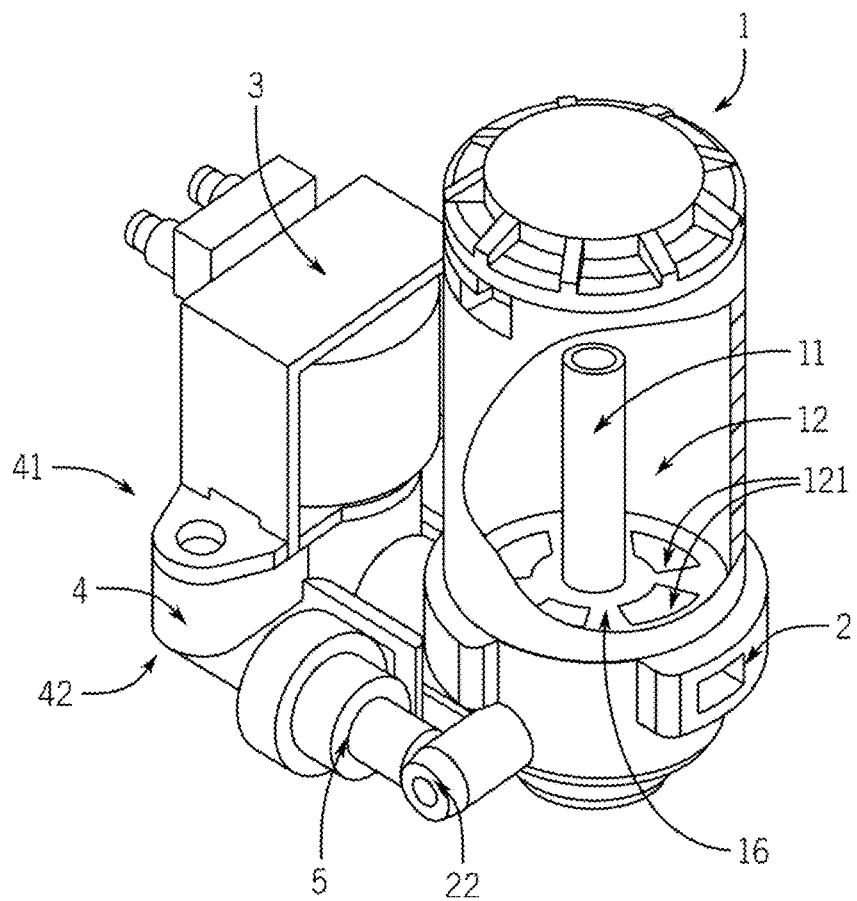
FIG. 1 is a structure schematic view of the descaling device of an electronic toilet in the present disclosure.
Figure 2:
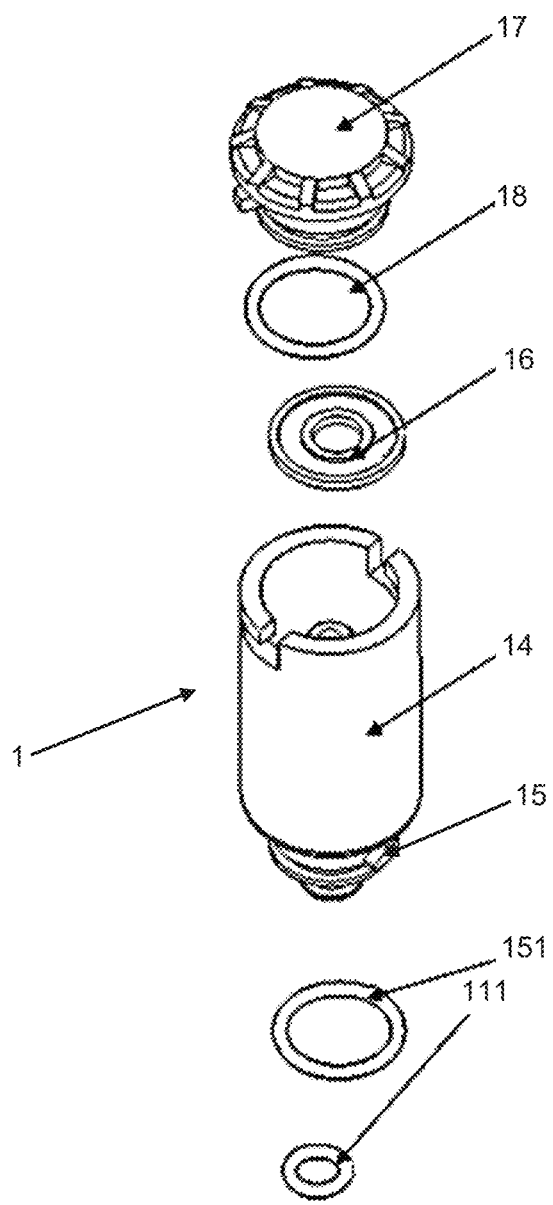
FIG. 2 is an exploded view of the descaling device body of the descaling device of an electronic toilet in the present disclosure.
Figure 3:
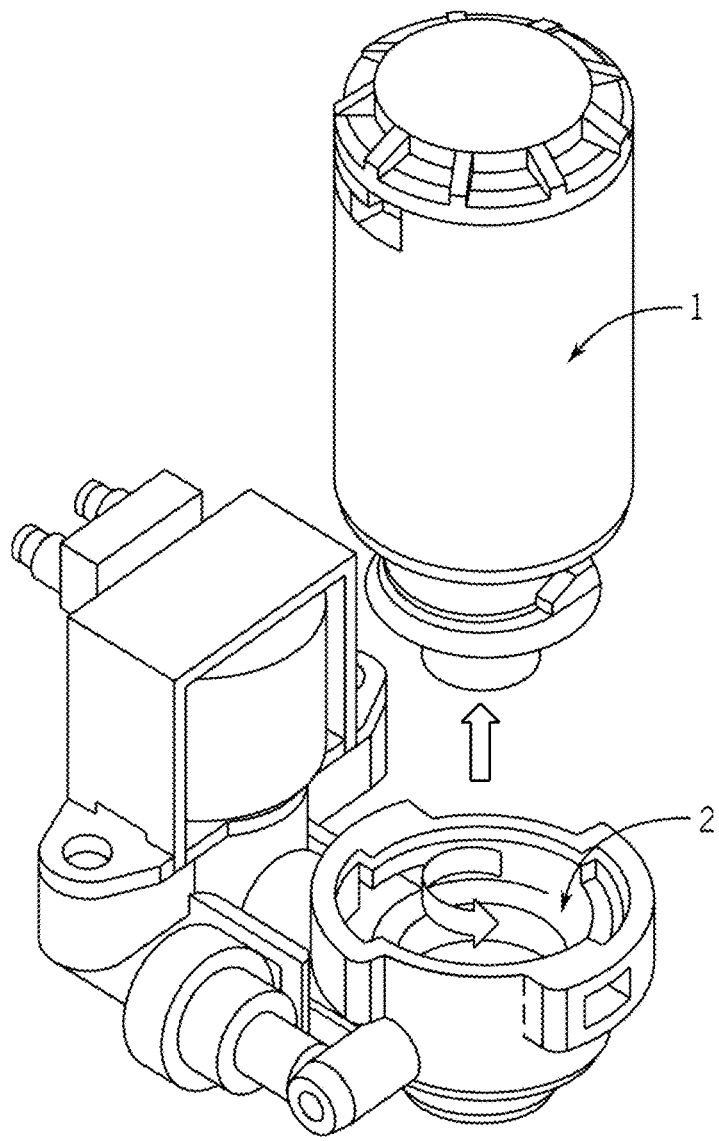
FIG. 3 is an installation schematic view of the descaling device of an electronic toilet in the present disclosure.
Figure 4:
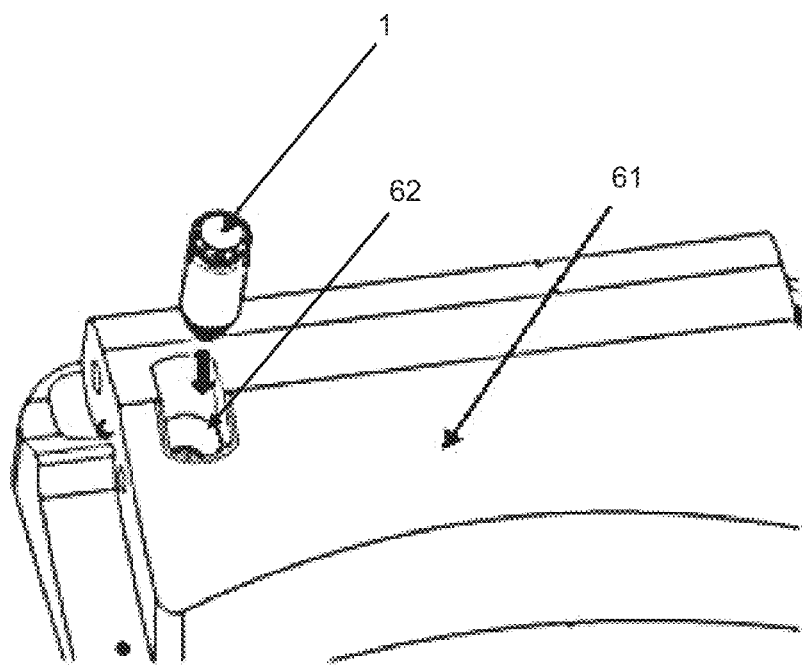
FIG. 4 is a schematic view of the descaling device of an electronic toilet in the present disclosure whose descaling device body is taken out from the body cover of the electronic toilet.
Figure 5:
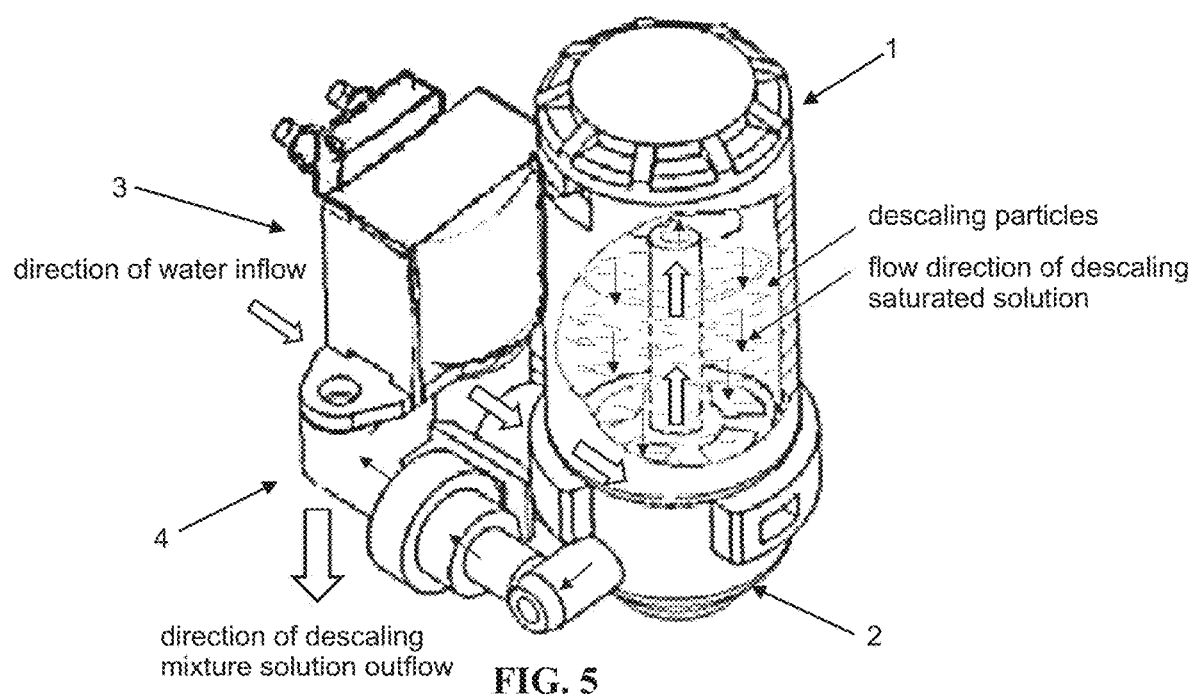
FIG. 5 is a schematic view of the water flows of the descaling device of an electronic toilet in the present disclosure.
Figure 6:
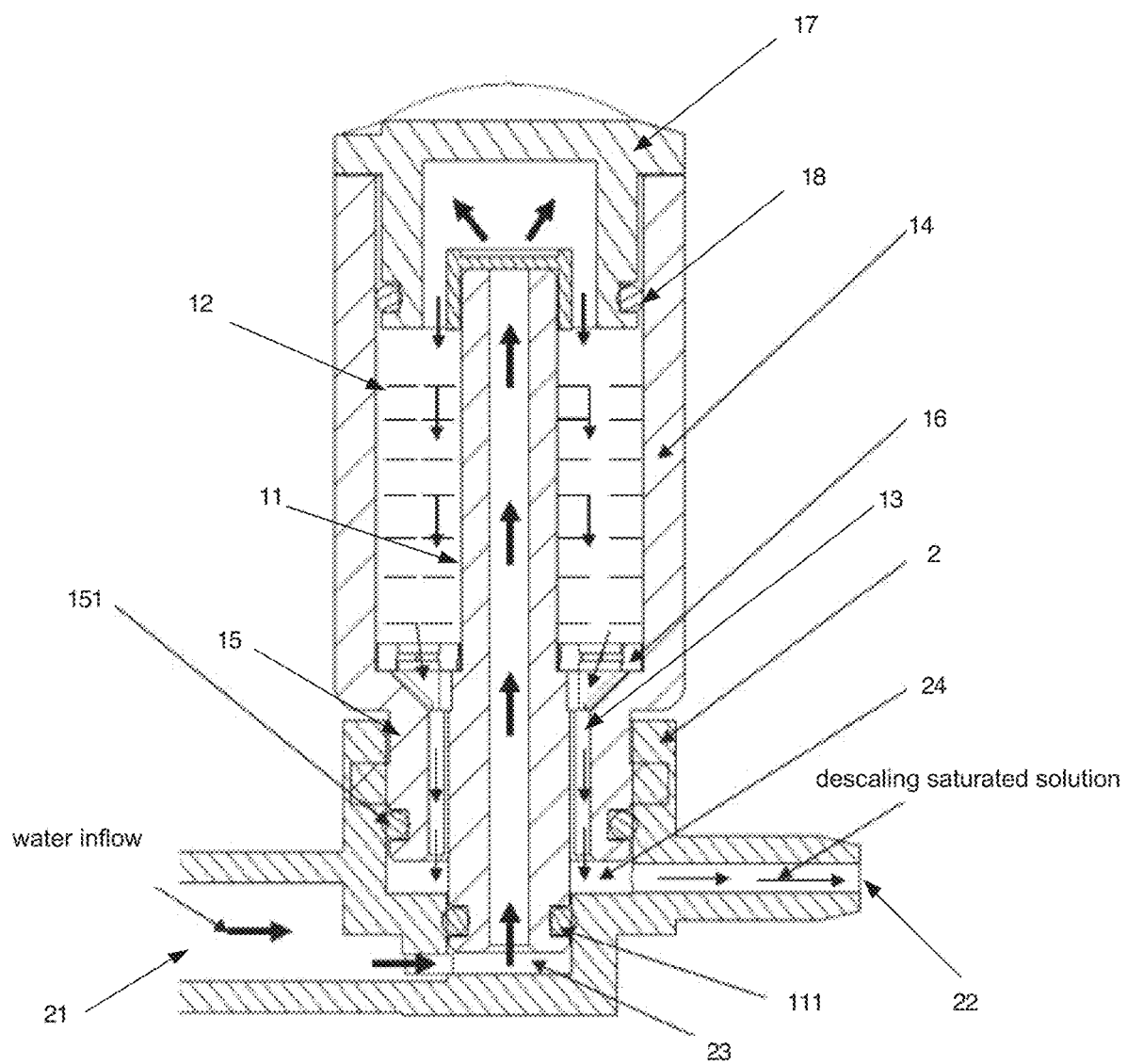
FIG. 6 is a sectional view of the descaling device body and the descaling device body fixing seat of an electronic toilet in the present disclosure.

As shown in FIGS. 1-6, the descaling device of an electronic toilet in the present disclosure may comprise a descaling device body 1, a descaling device body fixing seat 2, an electromagnetic switch valve 3, an electromagnetic switch valve fixing seat 4, and a one-way valve 5. Specifically, FIG. 1 is a structure schematic view of the descaling device of an electronic toilet in the present disclosure; FIG. 2 is an exploded view of the descaling device body of the descaling device of an electronic toilet in the present disclosure; FIG. 3 is an installation schematic view of the descaling device of an electronic toilet in the present disclosure; FIG. 4 is a schematic view of the descaling device of an electronic toilet in the present disclosure whose descaling device body is taken out from the body cover of the electronic toilet; FIG. 5 is a schematic view of the water flows of the descaling device of an electronic toilet in the present disclosure; FIG. 6 is a sectional view of the descaling device body and the descaling device body fixing seat of an electronic toilet in the present disclosure.

Specifically, the bottom of the descaling device body 1 is inserted into the descaling device body fixing seat 2. The descaling device body fixing seat 2 is internally provided with a body fixing seat water inlet 21 and a descaling saturated solution outlet 22. The descaling device body 1 is provided with a housing water inlet pipe 11. One end of the housing water inlet pipe 11 is connected to the body fixing seat water inlet 21, and the other end extends into the descaling agent chamber 12 of the descaling device body 1 for containing the descaling agent, and the bottom of the descaling agent chamber 12 is provided with a chamber liquid outlet 121. A water outlet gap 13 is formed between the outer wall of the housing water inlet pipe 11 and the inner chamber wall of the descaling agent chamber 12. The water outlet gap 13 communicates with the chamber liquid outlet 121 and the descaling saturated solution outlet 22 respectively.

The electromagnetic switch valve fixing seat 4 is provided with an electromagnetic switch valve fixing seat water inlet 41 and a descaling mixture water outlet 42. The electromagnetic switch valve 3 is arranged on the electromagnetic switch valve fixing seat 4 and controls the electromagnetic switch valve fixing seat water inlet 41 to be connected or disconnected with the body fixing seat water inlet 21. The descaling saturated solution outlet 22 communicates with the descaling mixture water outlet 42 through the one-way valve 5.

More specifically, the descaling device may comprise a descaling device body 1, a descaling device body fixing seat 2, an electromagnetic switch valve 3, an electromagnetic switch valve fixing seat 4, and a one-way valve 5. In an embodiment, the descaling device body 1 can be transparent or semi-transparent so that the user can observe the internal liquid level. The descaling device body 1 can be inserted downward and then rotated and fixed on the descaling device body fixing seat 2, or it can be rotated reversely and taken out upward.

The descaling device body 1 contains descaling agents therein, such as descaling particles. The descaling device body 1 is provided with a housing water inlet pipe 11. A gap 13 formed between the outer periphery of the housing water inlet pipe 11 and the inner chamber wall of the descaling agent chamber 12 is used as a saturated solution output pipe, and the gap 13 is connected with the descaling saturated solution outlet 22.

When in use, open the electromagnetic switch valve 3, and the product's water enters the body fixing seat water inlet 21 from the electromagnetic switch valve fixing seat water inlet 41, and then enters the descaling agent chamber 12 through the housing water inlet pipe 11. The water mixes with the descaling particles sealed in the descaling agent chamber 12 and form a saturated solution, and flows out from the descaling saturated solution outlet 22 through the gap formed between the outer periphery of the housing water inlet pipe 11 and the inner chamber wall of the descaling agent chamber 12. It enters the electromagnetic switch valve fixing seat 4 through the one-way valve 5 and flows out from the descaling mixture water outlet 42 into the product pipeline. The above-mentioned products are electronic toilets.

The descaling device provided by the present disclosure can, according to the product's instruction, after adding solid descaling agent one time, and then supplying clean water multiple times to dissolve the solid descaling agent, provide descaling agent solution to the pipe(s) of the internal components of the electronic toilet for descaling. Therefore, the problem of failure of the internal functional modules of the electronic toilet due to accumulation of scale and blockage can be solved, the service life of the components is then prolonged and the user's using experience to the product is improved. In the meanwhile, by forming the water outlet gap between the outer wall of the housing water inlet pipe and the inner chamber wall of the descaling agent chamber that is connected to the descaling saturated solution outlet, the overall volume of the descaling device is reduced.

In one embodiment, the descaling device body 1 comprises a housing 14 having the descaling agent chamber 12. The bottom of the housing 14 is provided with an end 15, the end 15 is inserted into the descaling device body fixing seat 2 and is detachably connected to the descaling device body fixing seat 2. One end of the housing water inlet pipe 11 is inserted into the descaling device body fixing seat 2 and communicates with the body fixing seat water inlet 21, and the other end extends into the housing 14 from the end 15.

Specifically, an end 15 is provided at the bottom of the housing 14. In an embodiment, the end 15 is a circular end. In an embodiment, the outer periphery of the end 15 is provided with a spiral structure and a fixed buckle, so as to be detachably connected to the descaling device body fixing seat 2. The inner hole of the circular end is separated into two layers of space inside and outside. The hollow part is the housing water inlet pipe 11. The gap formed between the outer periphery of the housing water inlet pipe 11 and the inner chamber wall of the housing 14 is connected with the descaling saturated solution outlet 22.

In this embodiment, the descaling device body 1 and the descaling device body fixing seat 2 are connected with each other by the end 15, and the end 15 is divided into two layers of space inside and outside, which further saves space.

In one embodiment, the descaling device body 1 further comprises an isolation screen 16 arranged on the chamber liquid outlet 121 and sleeved on the housing water inlet pipe 11.

Specifically, the isolation screen 16 is arranged on the bottom of the descaling agent chamber 12 of the descaling device body 1, so as to isolate the descaling particles to prevent them from blocking the saturated solution output channel formed between the outer periphery of the housing water inlet pipe 11 and the inner chamber wall of the housing 14.

In one embodiment, the descaling device body fixing seat 2 internally includes a water inlet chamber 23 and a solution outlet chamber 24. One end of the water inlet chamber 23 is connected with the body fixing seat water inlet 21, the other end is connected with the housing water inlet pipe 11. One end of the solution outlet chamber 24 is connected with the descaling saturated solution outlet 22, the other end is connected with the water outlet gap 13.

In this embodiment, a water inlet chamber 23 and a solution outlet chamber 24 are integrated in the descaling device body fixing seat 2, which can further save space.

In one embodiment, the diameter of the water inlet chamber 23 is different from the diameter of the solution outlet chamber 24.

In this embodiment, the diameter of the water inlet chamber 23 is different from the diameter of the solution outlet chamber 24, so that the ratio of the diameter of the water inlet chamber 23 to the diameter of the solution outlet chamber 24 can be adjusted to adjust the mixing ratio of the descaling solution and the inlet water, so as to control the final concentration of the descaling solution.

In one embodiment, the end of the housing water inlet pipe 11 inserted into the descaling device body fixing seat 2 is provided with a water inlet pipe sealing ring 111, the water inlet pipe sealing ring 111 isolates the water inlet chamber 23 and the solution outlet chamber 24.

In this embodiment, the water inlet pipe sealing ring 111 isolates the water inlet chamber 23 and the solution outlet chamber 24.

In an embodiment, an end sealing ring 151 arranged on the end 15 is further included.

The water inlet pipe sealing ring 111 and the end sealing ring 151 jointly isolate the water inlet chamber 23 and the solution outlet chamber 24.

In one embodiment, a three-way valve is provided in the electromagnetic switch valve fixing seat 4. The first passage of the three-way valve is connected with the electromagnetic switch valve fixing seat water inlet 41; the second passage of the three-way valve is connected with the one-way valve 5, the third passage of the three-way valve is connected with the descaling mixture water outlet 42.

Specifically, in order to save space, a three-way valve-like structure is integrated inside the electromagnetic switch valve fixing seat 4. A part of the water flow at the electromagnetic switch valve fixing seat water inlet 41 controlled by the electromagnetic switch valve 3 enters the descaling device body 1 via the body fixing seat water inlet 21. The descaling saturated solution flowing through the one-way valve 5 after flowing out of the descaling device body 1 is mixed with the water flow of the electromagnetic switch valve fixing seat water inlet 41 in the three-way structure space provided in the electromagnetic switch valve fixing seat 4, and then flows out from the descaling mixture water outlet 42 and flows through the subsequent components along with the product water flow for descaling. Of course, if space permits, a separate three-way valve can also be set on the periphery of the device, so that the product inlet water can be mixed with the descaling saturated solution, and then flows through the subsequent components.

In this embodiment, a three-way valve is arranged inside the electromagnetic switch valve fixing seat 4, thereby the overall volume is reduced.

In one embodiment, a descaling system of an electronic toilet is provided, the descaling system comprising an electronic toilet 6 and the aforesaid descaling device.

The electronic toilet 6 comprises a toilet body and the pipe contained in the toilet body. The toilet body is provided with a product water inlet switch solenoid valve 7 for controlling the connection and disconnection with the external water supply system. The electromagnetic switch valve fixing seat water inlet 41 of the descaling device is connected with the product water inlet, and the descaling mixture water outlet 42 of the descaling device is connected with one end of the pipe, and the other end of the pipe is provided with a water outlet device.

Figure 7:
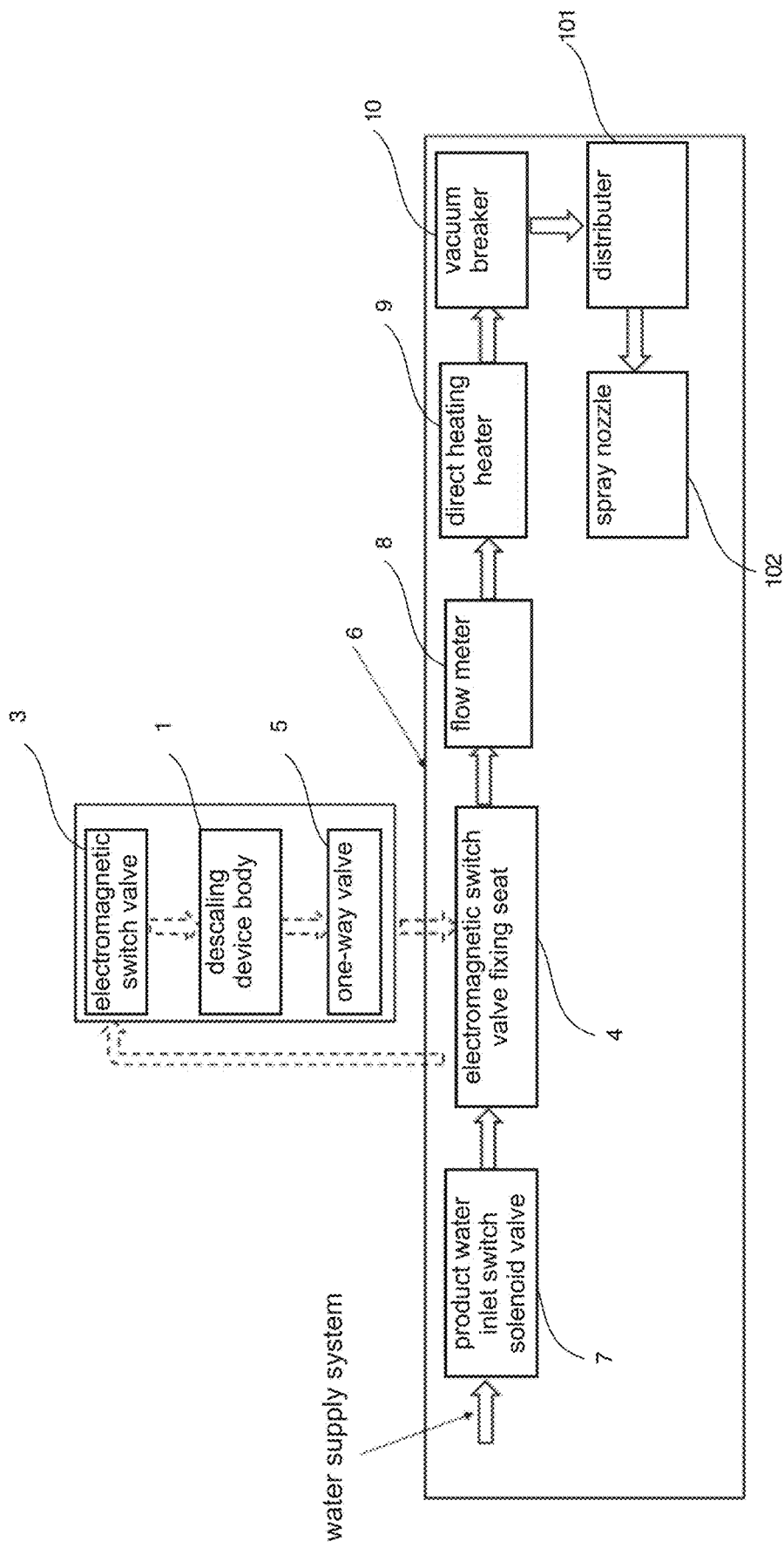
FIG. 7 is a schematic view of the descaling system of an electronic toilet in the present disclosure whose descaling function is not opened.
Figure 8:
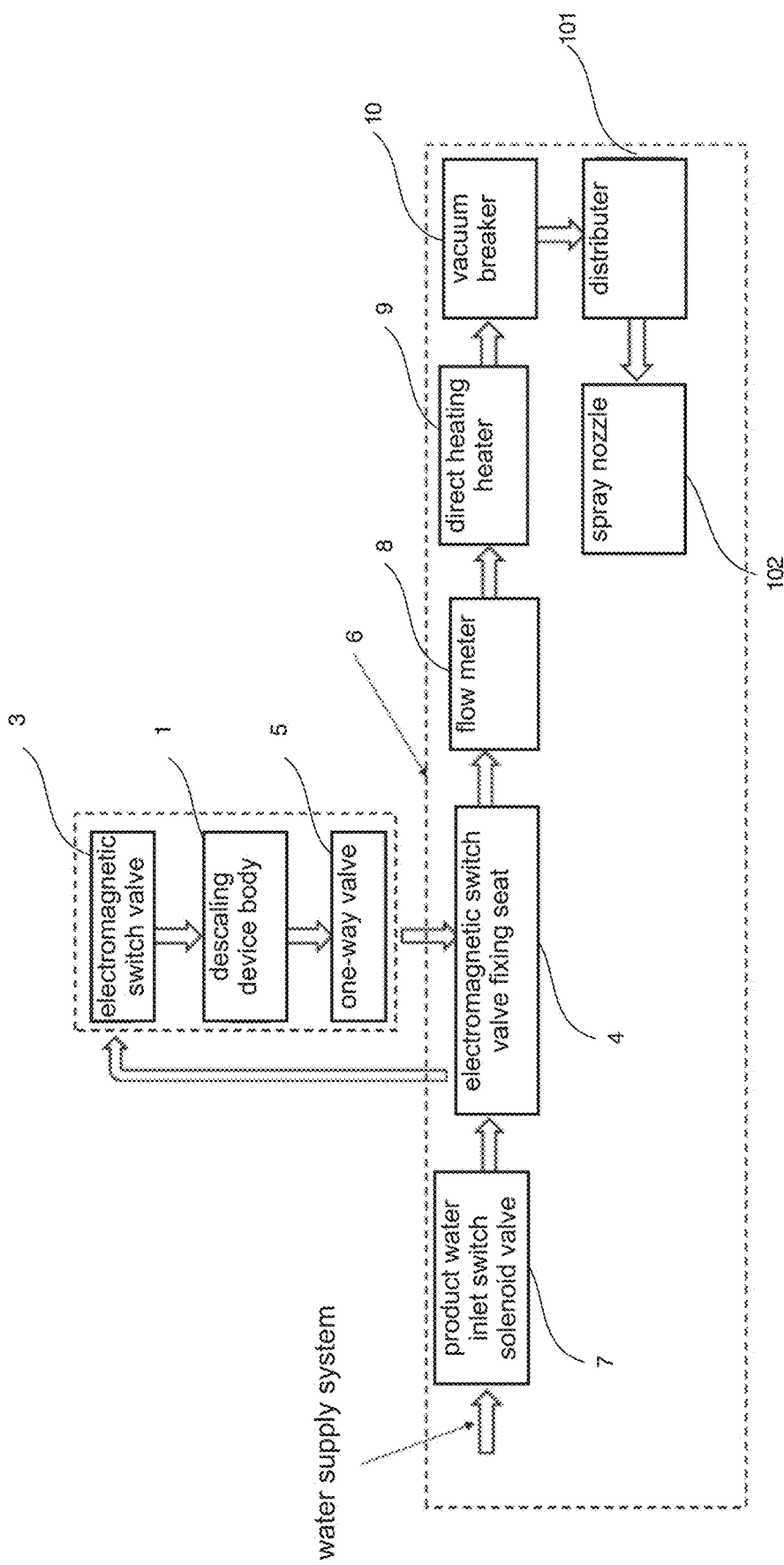
FIG. 8 is a schematic view of the descaling system of an electronic toilet in the present disclosure whose descaling function is opened.

Specifically, the descaling device of the electronic toilet is connected to the electronic toilet 6. FIG. 7 is a schematic view of the descaling system of an electronic toilet in the present disclosure whose descaling function is not opened. As shown in FIG. 7, it is the water circuit diagram when the descaling function is not turned on and is in normal operation. The dotted arrow indicates that water does not flow through the water circuit. Wherein, the water from the external water supply system enters the electromagnetic switch valve fixing seat water inlet 41 through the product water inlet switch solenoid valve 7. Because the electromagnetic switch valve 3 is closed, the clean water directly enters one end of the pipeline through the descaling mixture water outlet 42. Then, from the other end of the pipeline, it passes through a flow meter 8, a direct heating heater 9, a vacuum breaker 10, and a distributor 101 to the spray nozzle 102. FIG. 8 is a schematic view of the descaling system of an electronic toilet in the present disclosure whose descaling function is opened. As shown in FIG. 8, it's the water circuit diagram after turning on the descaling function. Wherein, the water from the external water supply system enters one end of the pipeline through the product water inlet switch solenoid valve 7. Since the electromagnetic switch valve 3 is opened, part of the clean water passing through the electromagnetic switch valve fixing seat water inlet 41 will pass through the body fixing seat water inlet 21. Then the water enters the descaling agent chamber 12 via the housing water inlet pipe 11, and mixes with the descaling particles sealed in the descaling agent chamber 12 and forms a saturated solution, and then flows out from the descaling saturated solution outlet 22 through the gap formed between the outer periphery of the housing water inlet pipe 11 and the inner chamber wall of the descaling agent chamber 12. It enters the electromagnetic switch valve fixing seat 4 through the one-way valve 5 and flows out from the descaling mixture water outlet 42 into the product pipeline. It, from the other end of the pipeline, reaches the spray nozzle 102 through the flow meter 8, the direct heating heater 9, the vacuum breaker 10, and the distributor 101.

The descaling device provided by the present disclosure can, according to the product's instruction, after adding solid descaling agent one time, and then supplying clean water multiple times to dissolve the solid descaling agent, provide descaling agent solution to the pipe(s) of the internal components of the electronic toilet for descaling. Therefore, the problem of failure of the internal functional modules of the electronic toilet due to accumulation of scale and blockage can be solved, the service life of the components is then prolonged and the user's using experience to the product is improved.

In one embodiment, the electronic toilet 6 further includes a toilet main body cover 61 arranged on the toilet body. The toilet main body cover 61 is provided with a toilet main body cover through hole 62. The descaling device body fixing seat 2, the electromagnetic switch valve 3, the electromagnetic switch valve fixing seat 4 of the descaling device, and the one-way valve 5 are arranged under the toilet main body cover 61. The descaling device body 1 is inserted into the descaling device body fixing seat 2 through the toilet main body cover through hole 62.

Specifically, as shown in FIG. 4, when the descaling particles stored in the descaling agent chamber 12 are exhausted, the user can rotate the descaling device body 1 from the descaling device body fixing seat 2 and take it out, open the outer cover and reinstall the descaling particles to start a new round of descaling.

The descaling device body 1 of this embodiment is inserted into the descaling device body fixing seat 2 through the toilet main cover through hole 62, so that the user can take out the descaling device body 1 to add descaling particles conveniently.

Figure 9:
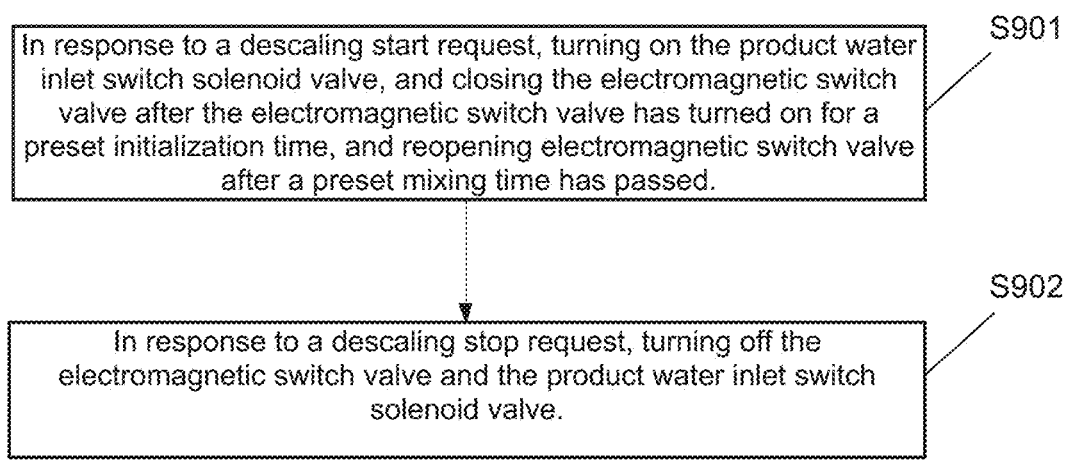
FIG. 9 is a workflow chart of the descaling method of the descaling system of an electronic toilet in the present disclosure.

FIG. 9 shows a descaling method for the descaling system of an electronic toilet in one embodiment of the present disclosure. It can comprise the following steps:

step S901: in response to a descaling start request, turning on the product water inlet switch solenoid valve 7, and closing the electromagnetic switch valve 3 after the electromagnetic switch valve 3 has turned on for a preset initialization time, and reopening electromagnetic switch valve 3 after a preset mixing time has passed;

step S902: in response to a descaling stop request, turning off the electromagnetic switch valve 3 and the product water inlet switch solenoid valve 7.

Specifically, the electromagnetic switch valve 3 is a switch for opening and closing the descaling device. When the electromagnetic switch valve 3 is turned on for descaling initialization, by controlling the opening time of the electromagnetic switch valve 3, a certain volume of product water flow enters the housing water inlet pipe 11 arranged in the middle of the inner chamber of the housing 14 of the descaling device body 1. It next enters the inner chamber of the housing 14, mixes with the descaling particles sealed inside the housing chamber, and forms a saturated solution. When the descaling function is officially started, the electromagnetic switch valve 3 will be opened again, and the saturated solution inside the housing 14 of the descaling device body 1 will be squeezed out from the outlet at the bottom of the housing 14 by the new incoming water flow, and will mix with the product water according to a certain proportion after passing through the external one-way valve 5. Then the solution flows through the subsequent parts with the product water flow for descaling. When the electromagnetic switch valve 3 is closed, the descaling function stops.

The descaling device provided by the present disclosure can, according to the product's instruction, after adding solid descaling agent one time, and then supplying clean water multiple times to dissolve the solid descaling agent, provide descaling agent solution to the pipe(s) of the internal components of the electronic toilet for descaling. Therefore, the problem of failure of the internal functional modules of the electronic toilet due to accumulation of scale and blockage can be solved, the service life of the components is then prolonged and the user's using experience to the product is improved.

In one embodiment, the step of reopening the electromagnetic switch valve 3 after the preset mixing time has passed specifically includes:

after the preset mixing time, opening the electromagnetic switch valve 3 for a preset time to make the pipe full, then closing the product water inlet switch solenoid valve 7, and reopening the product water inlet switch solenoid valve 7 after a preset descaling time has passed.

When the product is descaling, the descaling mixture solution flow will flow through the internal pipes of the product and out from the spray nozzle. User can also set a certain time to stop the product water supply when the descaling mixture solution fills the internal pipes of the product to make the descaling mixture solution stay in the internal pipes of the product for a certain period of time to allow the descaling mixture solution to fully react with the accumulated scale inside the pipes to decompose the scale. Since the amount of descaling mixture solution used to fill the internal pipes of the product each time for descaling is small, this procedure can also be cycled several times until the saturated solution of descaling agent in the upper chamber of the descaling device body is completely diluted by the inlet water. Or the user can add descaling particles once, and perform the descaling acts several times during the subsequent use of the product, so that the goal of adding the descaling particles once by the user and facilitating multiple times of use is met.

When the descaling is completed, the product water is reopened. On the one hand, the new water supply of the product will flush out the scale residue after the decomposition in the internal pipes of the product through the spray nozzle hole. On the other hand, it can also completely dissolve the fixed particles of descaling agent remaining in the descaling device body, the inner chamber of the descaling device body is also cleaned.

In this embodiment, the product water inlet switch solenoid valve 7 is closed for the descaling time, so that the descaling mixture solution can fully decompose the scale in the internal pipes of the product and improve the descaling effect.

As the best embodiment of the present disclosure, an automatic descaling device includes a descaling device body 1, a descaling device body fixing seat 2, an electromagnetic switch valve 3, an electromagnetic switch valve fixing seat 4, and a one-way valve 5. In an embodiment, the descaling device body 1 can be transparent or semi-transparent so that the user can observe the internal liquid level. The descaling device body 1 can be inserted downward and then rotated and fixed on the descaling device body fixing seat 2, or it can be rotated reversely and taken out upward.

The descaling device body 1 comprises a housing 14 having the descaling agent chamber 12, the isolation screen 16 arranged on the bottom of the descaling agent chamber 12 and sleeved on the housing water inlet pipe 11, and an upper cover 17. The bottom of the housing 14 is provided with an end 15, the end 15 is inserted into the descaling device body fixing seat 2 and is detachably connected to the descaling device body fixing seat 2. One end of the housing water inlet pipe 11 is inserted into the descaling device body fixing seat 2 and communicates with the body fixing seat water inlet 21, and the other end extends into the housing 14 from the end 15.

The upper cover 17 can be removed from the housing 14, so that the user can add descaling particles and screw it on the housing 14, and seal it by an upper cover sealing ring 18. The isolation screen 16 is placed at the bottom of the descaling agent chamber 12 of the housing 14, so as to isolate the descaling particles to prevent them from blocking the saturated solution output channel formed between the outer periphery of the housing water inlet pipe 11 and the inner chamber wall of the housing 14. In an embodiment, the end 15 is a circular end. In an embodiment, the outer periphery of the end 15 is provided with a spiral structure and a fixed buckle, so as to be detachably connected to the descaling device body fixing seat 2. The inner hole of the circular end is separated into two layers of space inside and outside. The hollow part is the housing water inlet pipe 11. The gap formed between the outer periphery of the housing water inlet pipe 11 and the inner chamber wall of the housing 14 is connected with the descaling saturated solution outlet 22.

The descaling device body fixing seat 2 and the electromagnetic switch valve fixing seat 4 are integrated into one through a locking structure to save space. The descaling device body fixing seat 2 is provided with an inner spiral groove and a fixing structure that match the water outlet end of the saturated solution of the body housing to fix the housing 14. The descaling device body fixing seat 2 includes a water inlet chamber 23 and a solution outlet chamber 24 located at relatively lower and upper positions with different diameters.

The descaling device body fixing seat 2 is sealed and matched with the water inlet pipe sealing ring 111 on the outer periphery of the lower end of the housing water inlet pipe 11 and the end sealing ring 151 on the outer periphery of the end 15 of the descaling device body 1 respectively, and forms two separate water inlet chamber 23 and solution outlet chamber 24.

The electromagnetic switch valve 3 is a switch for opening and closing the descaling device. When the electromagnetic switch valve 3 is turned on for descaling initialization, by controlling the opening time of the electromagnetic switch valve 3, a certain volume of product water flow enters the housing water inlet pipe 11 arranged in the middle of the inner chamber of the housing 14 of the descaling device body 1. It next enters the inner chamber of the housing 14, mixes with the descaling particles sealed inside the housing chamber, and forms a saturated solution. When the descaling function is officially started, the electromagnetic switch valve 3 will be opened again, and the saturated solution inside the housing 14 of the descaling device body 1 will be squeezed out from the outlet at the bottom of the housing 14 by the new incoming water flow, and will mix with the product water according to a certain proportion after passing through the external one-way valve 5. Then the solution flows through the subsequent parts with the product water flow for descaling. When the electromagnetic switch valve 3 is closed, the descaling function stops.

The electromagnetic switch valve fixing seat 4 is provided with an electromagnetic switch valve fixing seat water inlet 41 and a descaling mixture water outlet 42. A three-way valve-like structure is integrated inside the electromagnetic switch valve fixing seat 4. A part of the water flow at the electromagnetic switch valve fixing seat water inlet 41 controlled by the electromagnetic switch valve 3 enters the descaling device body 1 via the body fixing seat water inlet 21. The descaling saturated solution flowing through the one-way valve 5 after flowing out of the descaling device body 1 is mixed with the water flow of the electromagnetic switch valve fixing seat water inlet 41 in the three-way structure space provided in the electromagnetic switch valve fixing seat 4, and then flows out from the descaling mixture water outlet 42 and flows through the subsequent components along with the product water flow for descaling. Of course, if space permits, a separate three-way valve can also be set on the periphery of the device, so that the product inlet water can be mixed with the descaling saturated solution, and then flows through the subsequent components.

When the product is descaling, the descaling mixture solution flow will flow through the internal pipes of the product and out from the spray nozzle. User can also set a certain time to stop the product water supply when the descaling mixture solution fills the internal pipes of the product to make the descaling mixture solution stay in the internal pipes of the product for a certain period of time to allow the descaling mixture solution to fully react with the accumulated scale inside the pipes to decompose the scale. Since the amount of descaling mixture solution used to fill the internal pipes of the product each time for descaling is small, this procedure can also be cycled several times until the saturated solution of descaling agent in the upper chamber of the descaling device body is completely diluted by the inlet water. Or the user can add descaling particles once, and perform the descaling acts several times during the subsequent use of the product, so that the goal of adding the descaling particles once by the user and facilitating multiple times of use is met.

When the descaling is completed, the product water is reopened. On the one hand, the new water supply of the product will flush out the scale residue after the decomposition in the internal pipes of the product through the spray nozzle hole. On the other hand, it can also completely dissolve the fixed particles of descaling agent remaining in the descaling device body, the inner chamber of the descaling device body is also cleaned.

When the descaling particles stored in the descaling agent chamber 12 are exhausted, the user can rotate the descaling device body 1 from the descaling device body fixing seat 2 and take it out, open the outer cover and reinstall the descaling particles to start a new round of descaling.

The present disclosure solves the problem that the current electronic toilet without internal water tank and pump cannot achieve the descaling of internal components through the independent descaling device that can be easily disassembled from the product. The user can easily disassemble the descaling device body from the product, add descaling particles and reassemble it to the product for use.

The above-mentioned embodiments only express several implementation modes of the present disclosure, and the description is relatively specific and detailed, but it should not be understood as a limitation to the patent scope of the present disclosure. It should be pointed out that for those of ordinary skill in the art, without departing from the concept of the present disclosure, several modifications and improvements can also be made, and these all should fall within the protection scope of the present disclosure. Therefore, the protection scope of the present disclosure patent should be subject to the appended claims.

Embodiments of Liquid Supply Device, System, and Cleaning Method of Electronic Toilet The specific embodiments of the present disclosure are further described below in conjunction with the drawings.

Figure 10:
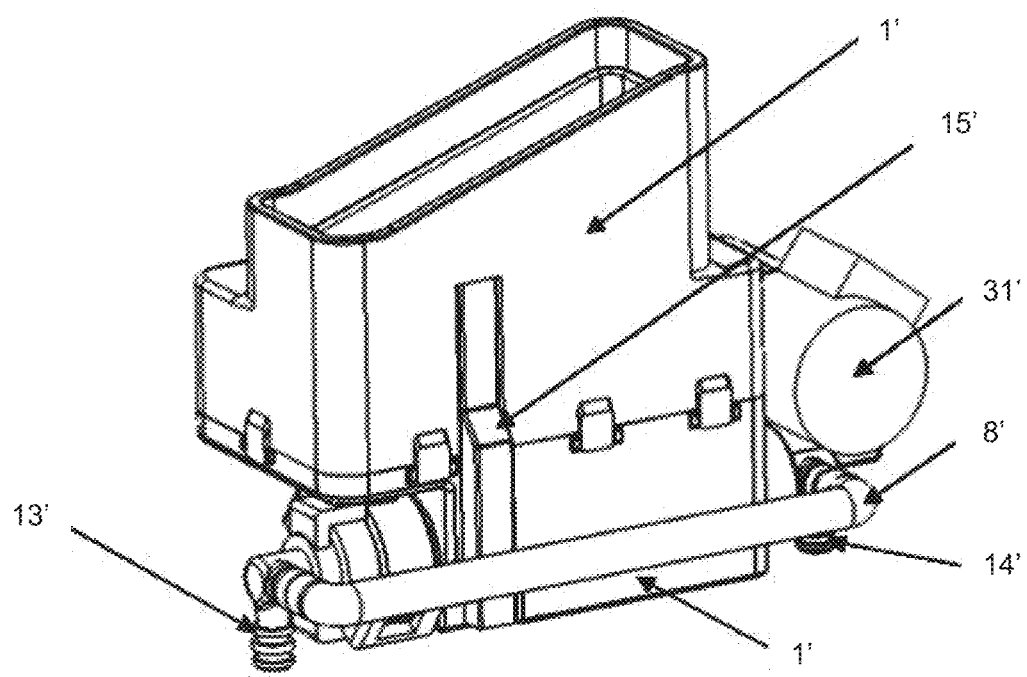
FIG. 10 is a schematic structural diagram of a liquid supply device for an electronic toilet of the present disclosure.
Figure 11:
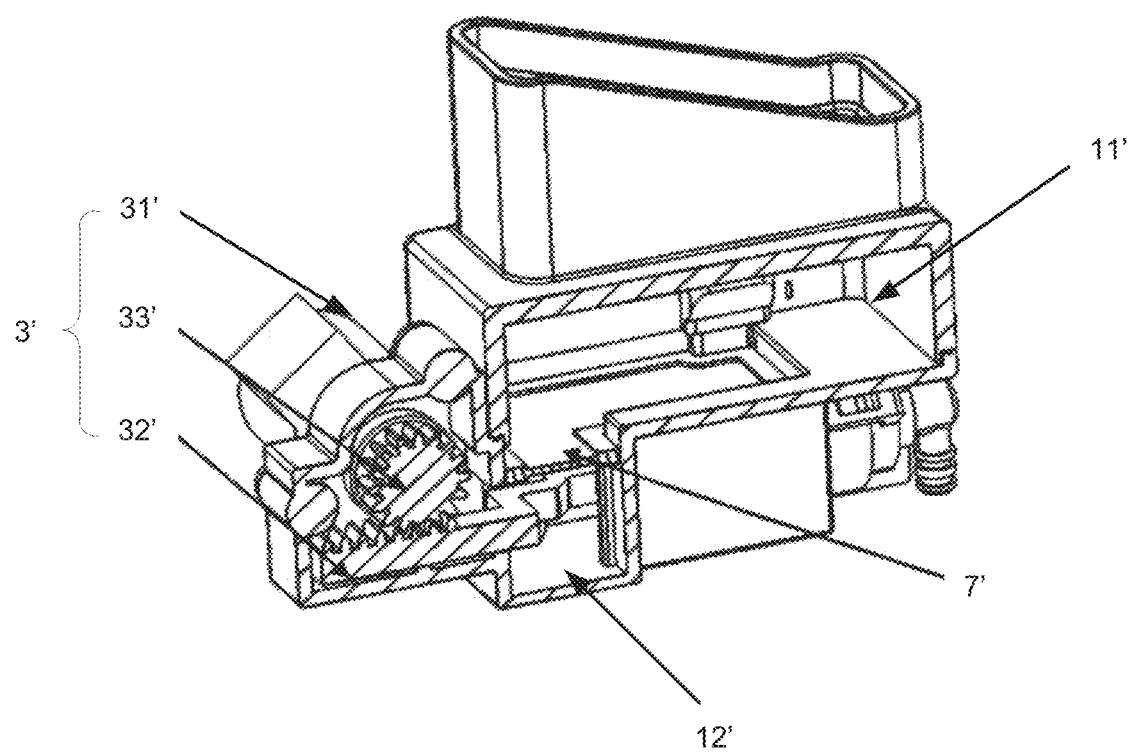
FIG. 11 is a perspective cross-sectional view of the liquid supply device for an electronic toilet of the present disclosure.
Figure 12:
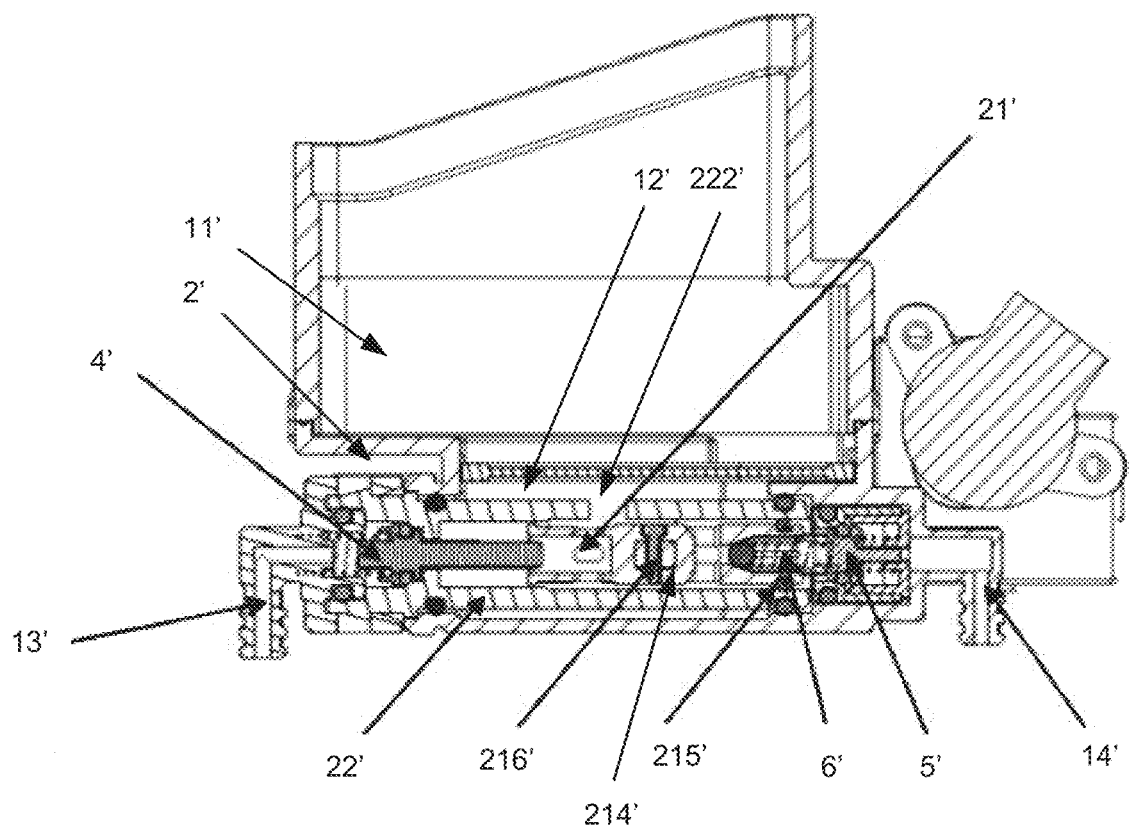
FIG. 12 is a plane cross-sectional view of the liquid supply device for an electronic toilet of the present disclosure.
Figure 13:
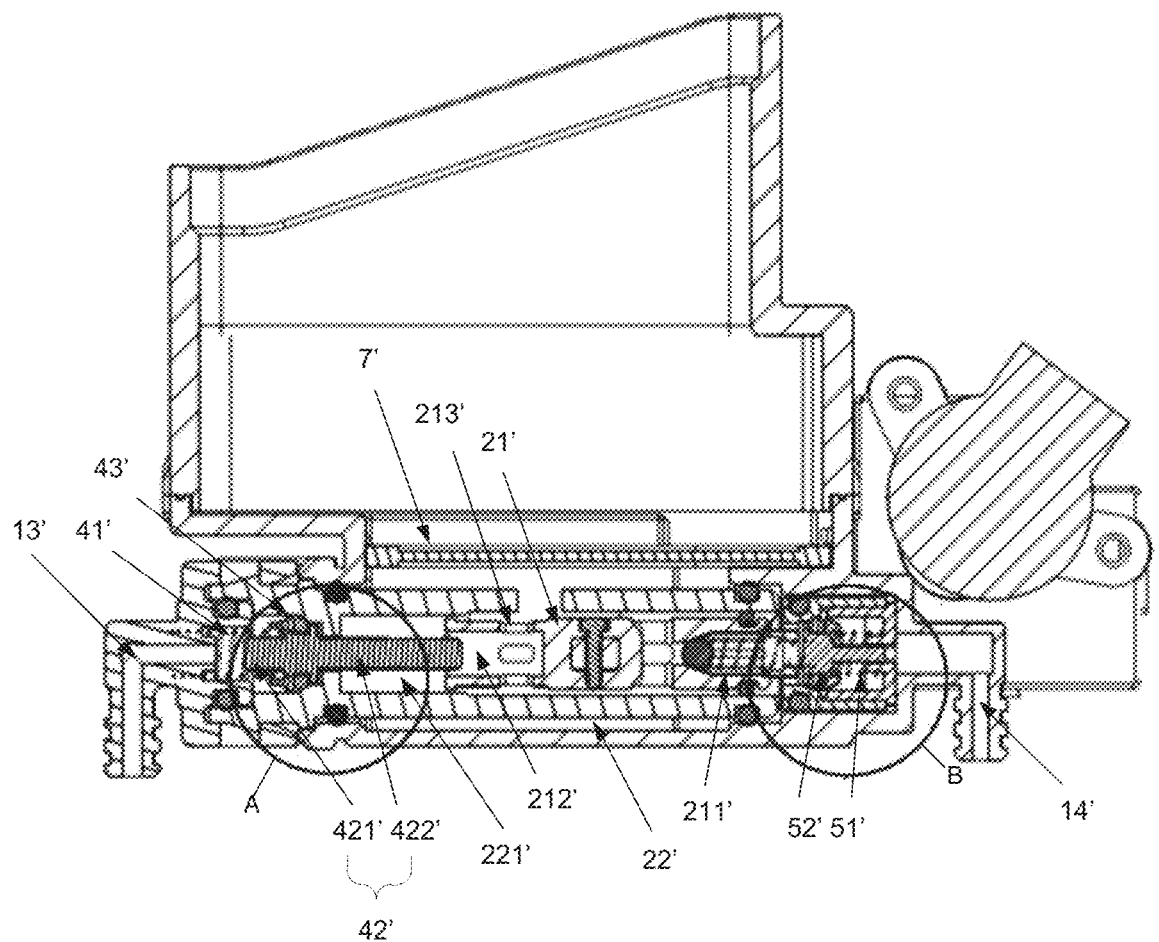
FIG. 13 is a schematic diagram of the check valve at the front and rear ends of the liquid supply device for an electronic toilet of the present disclosure in a closed state.
Figure 14:
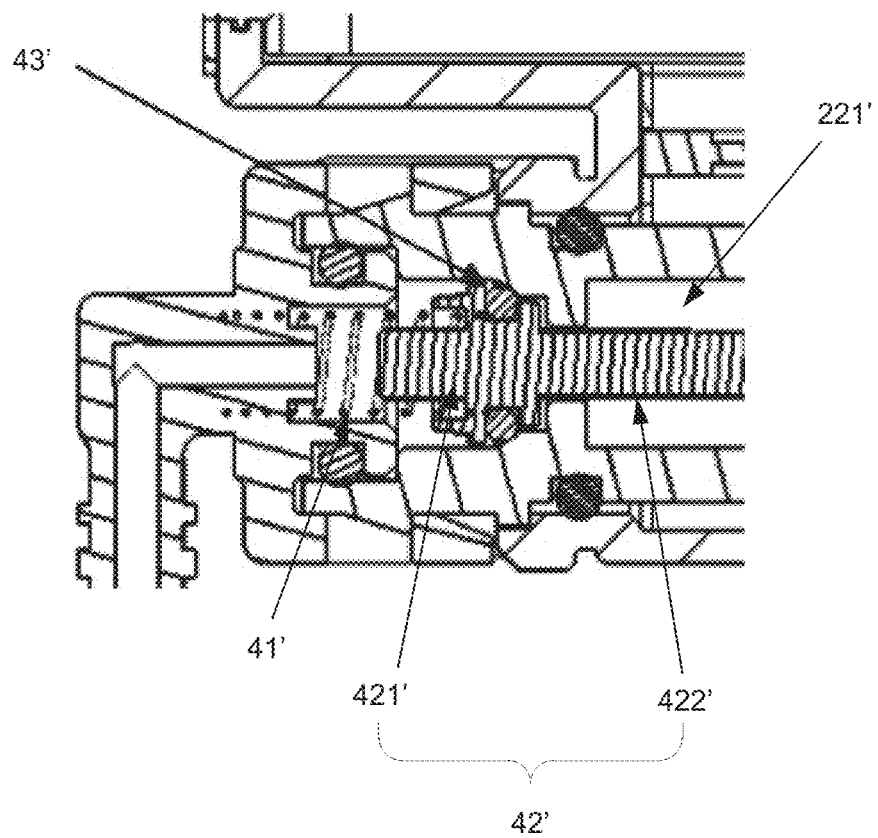
FIG. 14 is an enlarged view of area A in FIG. 13.
Figure 15:
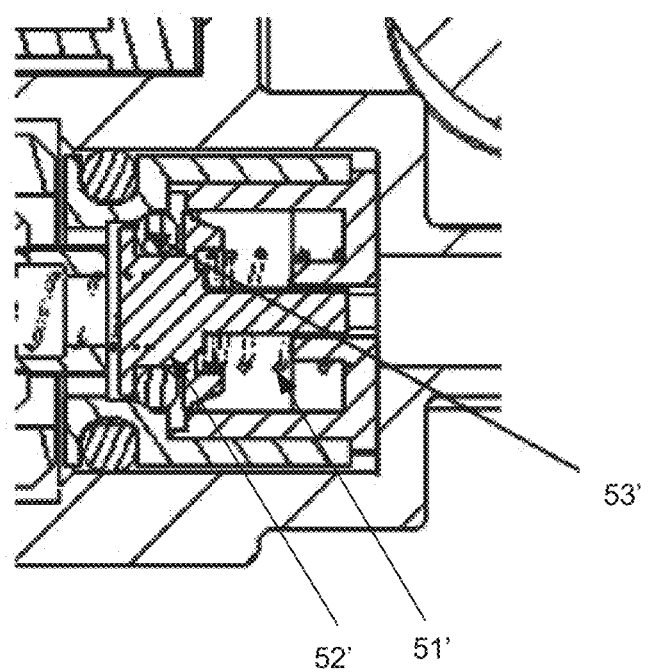
FIG. 15 is an enlarged view of area B in FIG. 13.
Figure 16:
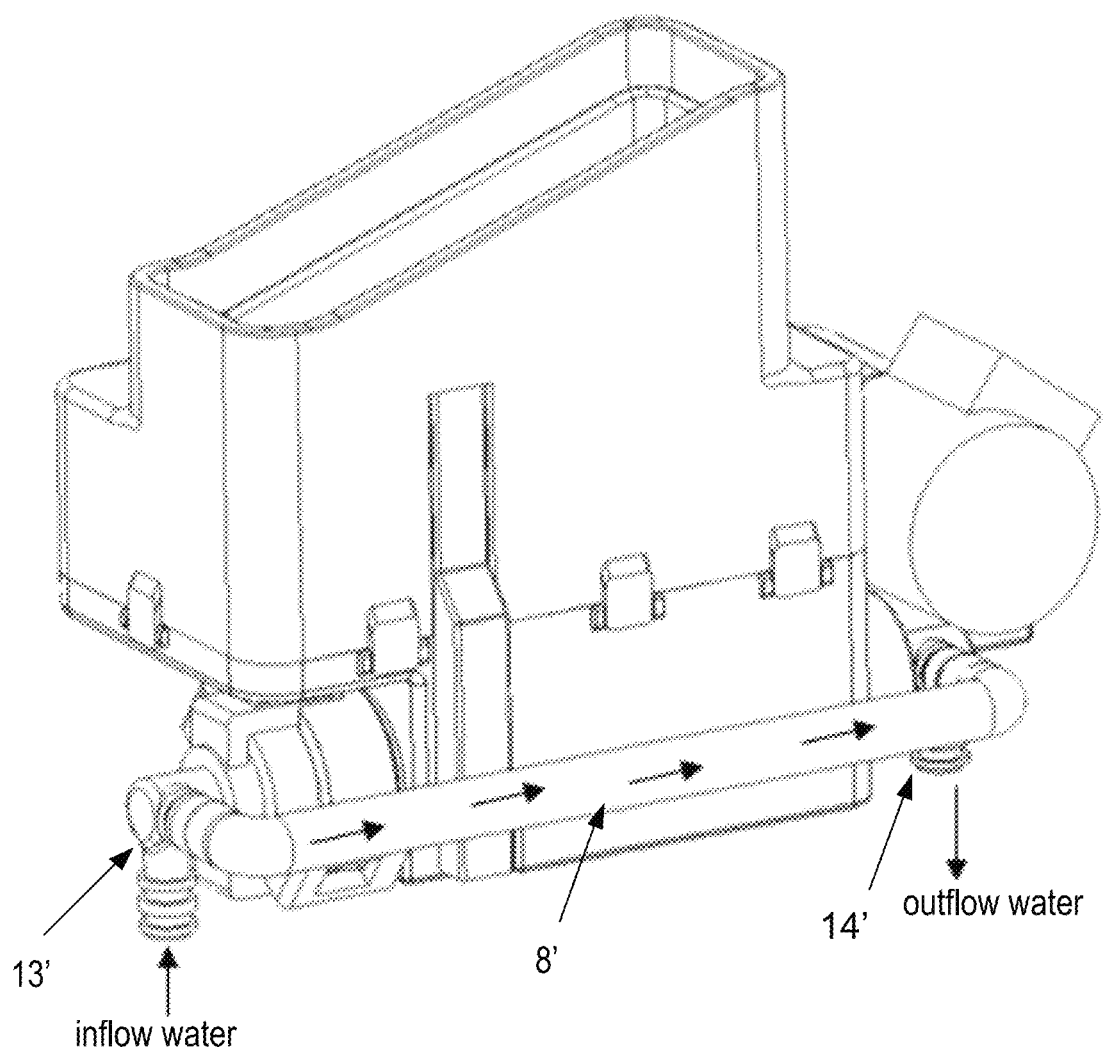
FIG. 16 is a schematic diagram of the side water pipe of the liquid supply device for an electronic toilet of the present disclosure.
Figure 17:
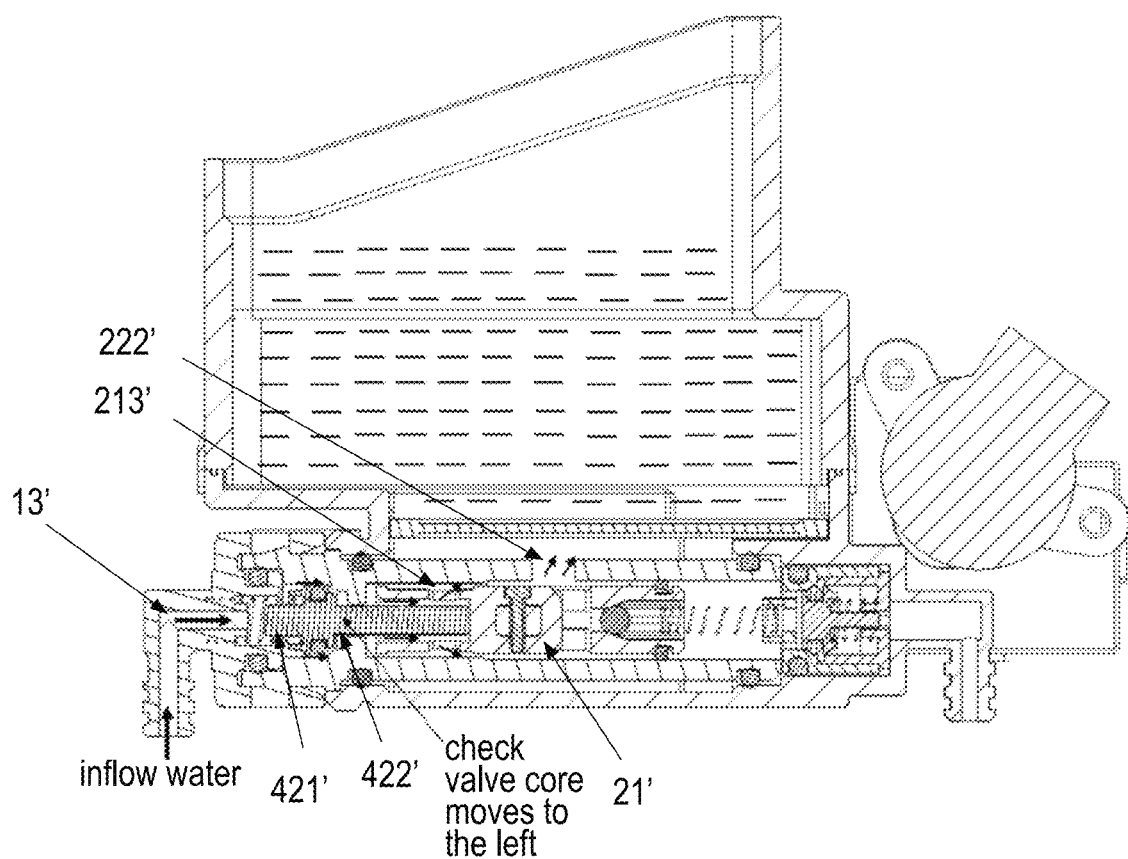
FIG. 17 is a schematic diagram of water inflow when the cleaning function of the liquid supply device is in the cleaning initialization state.
Figure 18:
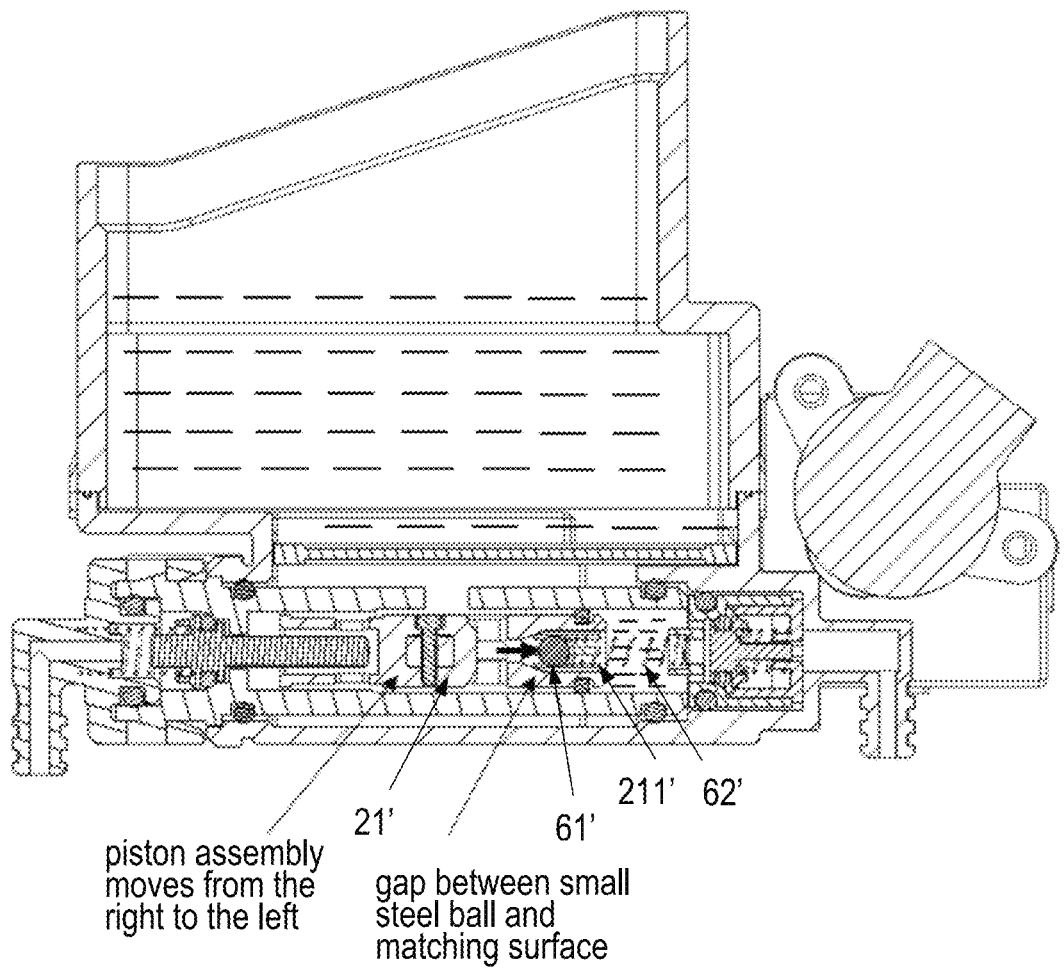
FIG. 18 is a schematic diagram of the state when the piston assembly moves to the left, the liquid suction chamber valve device at the right end of the piston rod is opened and the detergent saturated solution enters the liquid suction chamber.
Figure 19:
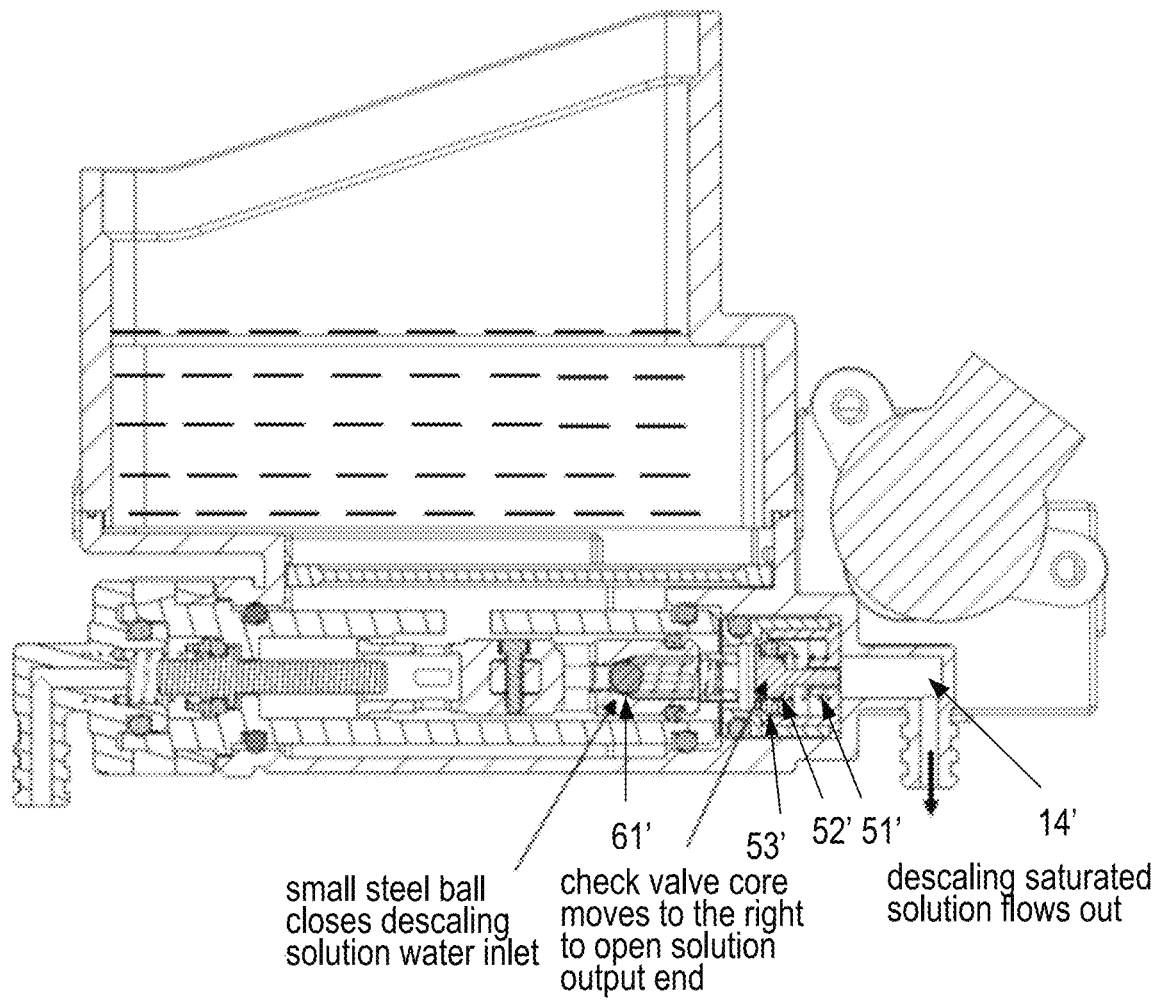
FIG. 19 is a schematic diagram of the state when the piton assembly moves to the right, the liquid suction chamber valve device at the right end of the piston rod is closed, the output end check valve at the right end is opened and the detergent saturated solution flows out.

FIG. 10 is a schematic structural diagram of a liquid supply device for an electronic toilet of the present disclosure; FIG. 11 is a perspective cross-sectional view of the liquid supply device for an electronic toilet of the present disclosure; FIG. 12 is a plane cross-sectional view of the liquid supply device for an electronic toilet of the present disclosure; FIG. 13 is a schematic diagram of the check valve at the front and rear ends of the liquid supply device for an electronic toilet of the present disclosure in a closed state; FIG. 14 is an enlarged view of area A in FIG. 13; FIG. 15 is an enlarged view of area B in FIG. 13; FIG. 16 is a schematic diagram of the side water pipe of the liquid supply device for an electronic toilet of the present disclosure; FIG. 17 is a schematic diagram of water inflow when the cleaning function of the liquid supply device is in the cleaning initialization state; FIG. 18 is a schematic diagram of the state when the piston assembly moves to the left, the liquid suction chamber valve device at the right end of the piston rod is opened and the detergent saturated solution enters the liquid suction chamber; FIG. 19 is a schematic diagram of the state when the piton assembly moves to the right, the liquid suction chamber valve device at the right end of the piston rod is closed, the output end check valve at the right end is opened and the detergent saturated solution flows out. As shown in FIGS. 10 to 19, a liquid supply device for an electronic toilet of the present disclosure comprises: a detergent storage box 1', a piston assembly 2', and a driving mechanism 3';

the detergent storage box 1' includes a detergent space 11' for containing detergent and a piston space 12' containing the piston assembly 2', the detergent space 11' communicates with the piston space 12'; the piston space 12' includes a water inlet end 13' arranged at the front end and a detergent saturated solution output end 14' arranged at the rear end; the water inlet end 13' is provided with a water inlet end check valve 4', the opening or closing of the water inlet end check valve 4' controls the communication or separation of the water inlet end 13' and the detergent space 11'; the detergent saturated solution output end 14' is provided with an output end check valve 5', the opening or closing of the output end check valve 5' controls the connection or disconnection of the detergent saturated solution output end 14' with the detergent space 11';

the piston assembly 2' is internally provided with a piston rod 21' driven by the driving mechanism 3' to reciprocate in the piston space 12'; the reciprocating movement of the piston rod 21' in the piston space 12' controls the opening or closing of the water inlet end check valve 4', the reciprocating movement of the piston rod 21' in the piston space 12' controls the opening or closing of the output end check valve 5'.

Specifically, the liquid supply device for an electronic toilet comprises: a detergent storage box 1', a piston assembly 2', and a driving mechanism 3'.

The internal space of the detergent storage box 1' is divided into a detergent space 11' and a piston space 12'. The detergent space 11' is used to add detergent and store the detergent. The detergent includes, but is not limited to, a descaling agent liquid, descaling particles, and a disinfecting detergent for cleaning and care, such as a female detergent, etc. The piston space 12' is used for setting the piston assembly 2'. In an embodiment, the piston space 12' is also used to accommodate part or all of the components of the driving mechanism 3'. The openable water inlet end check valve 4' provided at the water inlet end 13' is to prevent the product's inflow water from flowing into the liquid supply device when the normal flushing function of the product is turned on. On the other hand, it is used to drive the piston rod 21' to move forward through the driving mechanism 3' when opening the liquid supply device initialization program, contact and push the water inlet end check valve 4', and open the water inlet end check valve 4', so that a part of the product water can flow into the detergent storage box 1'. By setting the opening time, an appropriate amount of water is stored in the detergent storage box 1', so as to effectively contact the detergent stored in the detergent space 11'. When the amount of water entering the detergent storage box 1' reaches the required amount, the piston rod 21' moves rightward to the initial position under the action of the driving mechanism 3', and the water inlet end check valve 4' closes the water inflow. The output end check valve 5' provided at the detergent saturated solution output end 14' at the rear of the liquid supply device can, on the one hand, prevent the saturated solution formed in the detergent storage box 1' from leaking into the product pipes when the cleaning program is initialized. On the other hand, when the cleaning function is turned on, when the piston rod 21' pushes the detergent saturated solution, under the action of the solution pressure, the output end check valve 5' can be opened to inject the detergent saturated solution into the flowing water inside the product.

In an embodiment, an overflow hole and an overflow side pipe 15' are provided on the side of the detergent storage box 1'. When the liquid supply device is initialized, if too much water enters the detergent storage box 1', or the front-end check valve fails, excessive inflow water can be discharged from the overflow side pipe 15' to the product base and flow into the ceramic bowl part of the electronic toilet.

In an embodiment, the driving mechanism 3' includes a driving motor 31' and a rack driving arm 32'. One end of the rack driving arm 32' meshes with a driving gear 33' of the driving motor 31', and the other end is connected with the piston rod 21'. A small square groove 214' is provided in the middle of the side surface of the piston rod 21' for fixing the rack driving arm 32' through a driving arm fixing screw 216'.

The liquid supply device provided by the present disclosure controls the opening or closing of the check valve inside the liquid supply device by means of the action of the driving mechanism and the piston rod, without the need for an additional pump to push or suck, and it is suitable for most electronic toilets without internal water tank and pump. In the meanwhile, because the overall structure is compact, the size and shape of the opening can be freely defined according to the installation position and space structure of the liquid supply device for product design, without the restriction of the size and shape of the opening and the need for a complicated sealing and locking mechanism.

In one of the embodiments, a liquid suction chamber 211' is provided between the piston rod 21' and the output end check valve 5'; the liquid suction chamber 211' is provided with a liquid suction chamber valve device 6', the opening or closing of the liquid suction chamber valve device 6' controls the connection or separation of the liquid inlet of the liquid suction chamber 211' and the detergent space 11'; the opening or closing of the output end check valve 5' controls the connection or separation of the liquid inlet of the liquid suction chamber 211' and the detergent saturated solution output end 14'; the reciprocating movement of the piston rod 21' in the piston space 12' controls the opening or closing of the liquid suction chamber valve device 6'.

Specifically, the liquid suction chamber 211' provided between the piston rod 21' and the output end check valve 5' is used for absorbing the detergent saturated solution. When the cleaning function is turned on, the detergent saturated solution in the liquid suction chamber 211' is pushed by the piston rod 21', and the output end check valve 5' is opened through the action of the solution pressure. The liquid suction chamber valve device 6' forms a similar check valve combination structure, and the liquid suction chamber valve device 6' is opened or closed to suck the detergent saturated solution into the liquid suction chamber 211'.

In this embodiment, the liquid suction chamber 211' is used to limit the amount of detergent saturated solution squeezed out by the piston each time the piston reciprocates. Therefore, it can be controlled by a program. When the cleaning function is turned on, the piston assembly reciprocates multiple times continuously, thereby continuously squeeze out the detergent saturated solution to mix the detergent saturated solution with the product running water in a certain proportion to achieve cleaning purpose, such as descaling or feminine care.

In one of the embodiments, the piston rod 21' is driven by the driving mechanism 3' to perform a water inflow action, a dissolving action, a liquid suction action and a liquid discharge action in the piston space 12', wherein:

the water inflow action is a movement of first stroke distance from the detergent saturated solution output end 14' to the water inlet end 13', when the piston rod 21' performs the water inflow action, the water inlet check valve 4' is opened, the output end check valve 5' is closed, and the liquid suction chamber valve device 6' is closed;

the dissolving action is a movement of first stroke distance from the water inlet end 13' to the detergent saturated solution output end 14'; when the piston rod 21' performs the dissolving action, the water inlet end check valve 4' is closed, the output end check valve 5' is closed, and the liquid suction chamber valve device 6' is closed;

the liquid suction action is a movement of second stroke distance from the detergent saturated solution output end 14' to the water inlet end 13', the second stroke distance is less than the first stroke distance; when the piston rod 21' performs the liquid suction action, the water inlet end check valve 4' is closed, the output end check valve 5' is closed, and the liquid suction chamber valve device 6' is opened;

the liquid discharge action is a movement of second stroke distance from the water inlet end 13' to the detergent saturated solution output end 14', the second stroke distance is less than the first stroke distance; when the piston rod 21' performs the liquid discharge action, the water inlet end check valve 4' is closed, the output end check valve 5' is opened, and the liquid suction chamber valve device 6' is closed.

Specifically, in this embodiment, the water inflow action is performed first, and the piston rod 21' moves toward the water inlet end check valve 4', pushes the water inlet end check valve 4', and imports water from the product. Then, the dissolving action is performed, the piston rod 21' moves away from the water inlet end check valve 4', and the water inlet end check valve 4' is closed. Wait until the water and detergent particles are fully dissolved. Then the liquid suction action is performed. Since the second stroke distance of the piston rod 21' movement is less than the first stroke distance, the piston rod 21' does not touch the water inlet end check valve 4' when performing the liquid suction action, and keeps the water inlet end check valve 4' closed, only opens the liquid suction chamber valve device 6', so the detergent saturated solution is sucked into the liquid suction chamber 211'. Finally the liquid discharge action is performed, the liquid suction chamber valve device 6' is closed, and the output end check valve 5' is opened to squeeze out the detergent saturated solution.

In this embodiment, the detergent particles can be fully dissolved, and the detergent saturated solution and the product inflow water can be mixed in a certain proportion when the liquid is discharged, so as to achieve cleaning purpose, such as descaling or feminine care.

In one of the embodiments, the piston assembly 2' further comprises a piston assembly sleeve 22'; the piston assembly sleeve 22' is internally provided with a sleeve chamber 221' for containing the piston rod 21', the chamber wall of the sleeve chamber 221' is provided with a sleeve through hole 222' communicating with the detergent space 11';

the water inlet end check valve 4' is arranged outside the sleeve chamber 221', the opening or closing of the water inlet end check valve 4' controls the communication or separation of the water inlet end and the sleeve chamber 221';

the output end check valve 5' is arranged outside the sleeve chamber 221', the opening or closing of the output end check valve 5' controls the communication or separation of the detergent saturated solution output end 14' and the sleeve chamber 221'.

Specifically, the piston assembly sleeve 22' is provided with a sleeve chamber 221' to accommodate the movement of the piston rod 21'. In the meanwhile, the water inlet end check valve 4' and the output end check valve 5' are arranged outside the sleeve chamber 221' to control the opening and closing of the sleeve chamber 221' through the water inlet end check valve 4' and the output end check valve 5', which realizes multiple ways of opening and closing the sleeve chamber 221'.

In one of the embodiments, the water inlet end check valve 4' comprises a water inlet check valve spring 41' arranged outside the sleeve chamber 221' and a water inlet check valve core 42'; one end of the water inlet check valve spring 41' is fixed to the water inlet end 13', the other end is pressed against the water inlet check valve core 42'; the water inlet check valve core 42' includes a valve core head 421' and a valve core rod 422'; the water inlet check valve spring 41' is pressed against the valve core head 421', the valve core rod 422' is inserted into the sleeve chamber 221';
  under the water inflow action, the piston rod 21' contacts the valve core rod 422' and drives the valve core head 421' to open the sleeve chamber 221';
  under the dissolving action, the liquid suction action, or the liquid discharge action, the piston rod 21' and the valve core rod 422' are separated, the valve core head 421' resets and closes the sleeve chamber 221'.

Specifically, since a valve core rod 422' is provided on the side of the water inlet end check valve core 42', when the initialization program of the liquid supply device is opened, the piston rod 21' of the piston mechanism is driven to move forward by the driving mechanism 3', contact the valve core rod 422' and push the valve core head 421' to open the water inlet end check valve core 42', so that a part of the product inflow water can flow into the detergent storage box 1'. And by the opening time setting, the right amount of water is allowed to be stored in the box in order to effectively contact the detergent stored in the detergent space 11'. When the amount of water entering the detergent storage box 1' reaches the required amount, the piston rod 21' moves to the right under the action of the driving mechanism 3' to the initial position, the water inlet end check valve core 42' moves to the right under the action of the reverse force of the water inlet end check valve spring 41' and then closes the water inflow.

In an embodiment, the valve core head 421' of the water inlet end check valve core 42' is provided with a water inlet end check valve sealing ring 43'. The water inlet end check valve sealing ring 43' match up with the sealing section of the outer wall of the sleeve chamber 221' to achieve sealing.

In this embodiment, the water inlet end check valve 4' is used to control the connection or disconnection between the water inlet end 13' and the sleeve chamber 221'.

In one of the embodiments, the end of the piston rod 21' close to the water inlet end check valve 4' is arranged to accommodate the valve core rod chamber 212' of the valve core rod 422', the chamber wall of the valve core rod chamber 212' is provided with a valve core rod chamber wall through hole 213' communicating with the sleeve through hole 222'.

Specifically, the hollow structure at the left end of the piston rod 21' is a valve core rod chamber 212' to accommodate the valve core rod 422' of the water inlet end check valve 4'. The valve core rod chamber 212' is provided with a valve core rod chamber wall through hole 213' on the circumference to facilitate water inflow.

In this embodiment, the valve core rod chamber 212' is provided to accommodate the valve core rod 422', which further reduces the overall structure.

In one of the embodiments, the output end check valve 5' comprises: an output end check valve spring 51' arranged outside the liquid suction chamber 211', and an output end check valve core 52'; one end of the output end check valve spring 51' is fixed to the detergent saturated solution output end 14', the other end is pressed against the output end check valve core 52';
  under the liquid discharge action, the output end check valve core 52' opens the detergent saturated solution output end 14';
  under the water inflow action, the dissolving action, or the liquid suction action, the output end check valve core 52' closes the detergent saturated solution output end 14'.

Specifically, when the cleaning function is turned on, when the piston rod 21' pushes the detergent saturated solution, due to the compression of the space of the liquid suction chamber 211', the internal pressure transfers to the right and will open an output end check valve core 52' at the right end, and will inject the detergent saturated solution into the running water inside the product.

In an embodiment, an output end check valve sealing ring 53' is provided on the output end check valve core 52'. The output end check valve sealing ring 53' match up with the sealing section of the outer wall of the sleeve chamber 221' to achieve sealing.

In this embodiment, the output end check valve 5' is used to control the connection or disconnection between the detergent saturated solution output end 14' and the liquid suction chamber 211'.

In one of the embodiments, the liquid suction chamber valve device 6' comprises a liquid suction sealing heading bead 61' and a liquid suction sealing spring 62'; the liquid suction sealing heading ball 61' is arranged at the liquid inlet of the liquid suction chamber 211'; one end of the liquid suction sealing spring 62' presses against the output end check valve 5', the other end presses against the liquid suction sealing heading bead 61';
  under the liquid suction action, the liquid suction sealing heading bead 61' opens the liquid inlet of the liquid suction chamber 211';
  under the water inflow action, the dissolving action, or the liquid discharge action, the liquid suction sealing heading bead 61' closes the liquid inlet of the liquid suction chamber 211'.

Specifically, the liquid suction chamber 211' at the right end of the piston rod 21' contains a liquid suction sealing spring 62' and a liquid suction sealing heading ball 61' internally. In an embodiment, the liquid suction sealing heading ball 61' is a steel ball. When the product completes the cleaning initialization program and starts the cleaning function, the piston rod 21' is pushed by the driving mechanism 3' to move to the left by a second stroke distance. As the piston rod 21' moves to the left, the space of the liquid suction chamber 211' increases and a negative pressure is generated. This sucks the liquid suction sealing heading ball 61' to the right. Because the pressure of the liquid suction sealing spring 62' decreases with the lengthening of the space distance, the liquid suction sealing heading ball 61' can move to the right, so that a gap between the liquid suction sealing heading ball 61' and the matching sealing slopes of the liquid inlet of the liquid suction chamber 211' will be formed, and the detergent saturated solution will be sucked into the enlarged liquid suction chamber 211'. When the piston rod 21' moves to the right under the action of the driving mechanism 3', the liquid suction sealing heading ball 61' will move to the left and block and close the liquid inlet of the liquid suction chamber 211' under the reaction of the liquid suction sealing spring 62'. At the same time, due to the compression of the space of the liquid suction chamber 211', the internal pressure transfers to the right and will open the output end check valve 5' at the right end. Then the saturated detergent solution is squeezed into the product inflow water and mixed into a detergent mixed solution.

In an embodiment, a piston rod sealing ring 215' is provided on the piston rod 21' to ensure the sealing of the liquid suction chamber 211'.

In this embodiment, the liquid suction chamber valve device 6' is opened or closed by the movement of the liquid suction sealing heading ball 61'.

Figure 20:
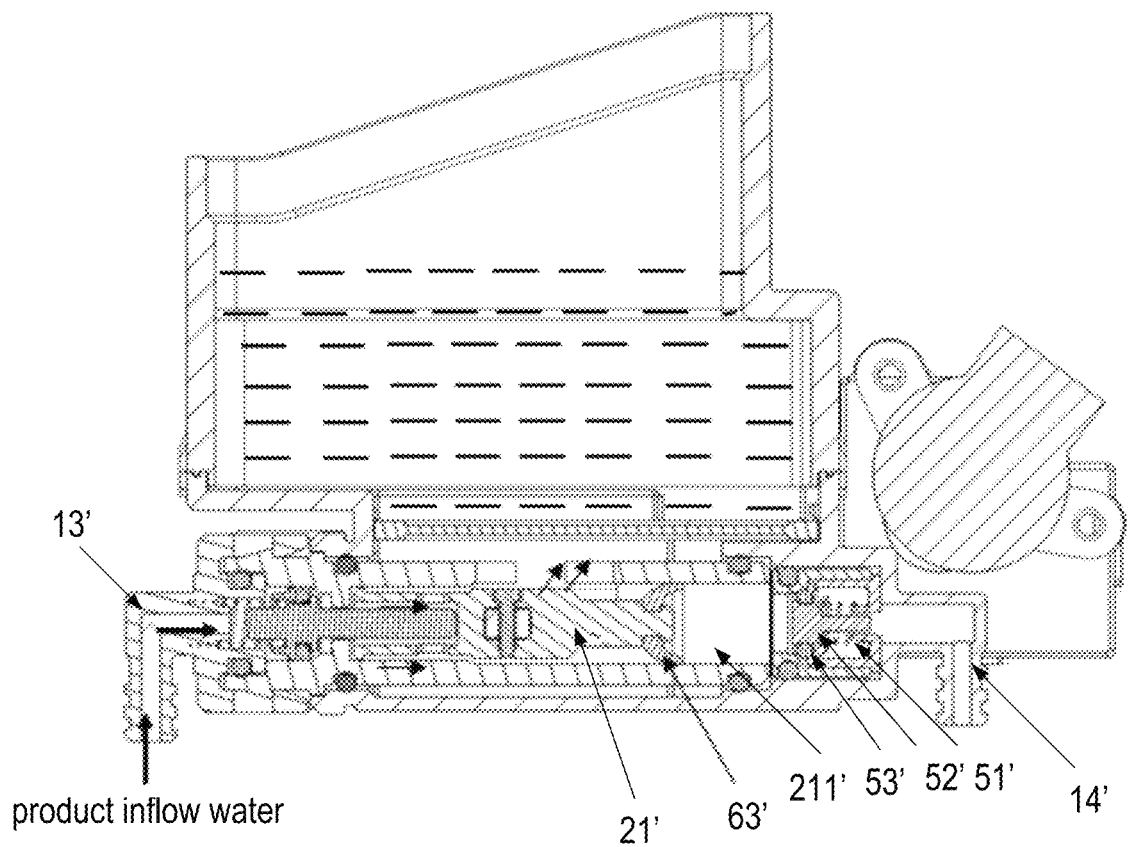
FIG. 20 is a schematic diagram of the state when the product flow water enters the storage box of the liquid supply device during the cleaning initialization in the embodiment of the present disclosure that uses a leather bowl as the liquid suction chamber valve device.
Figure 21:
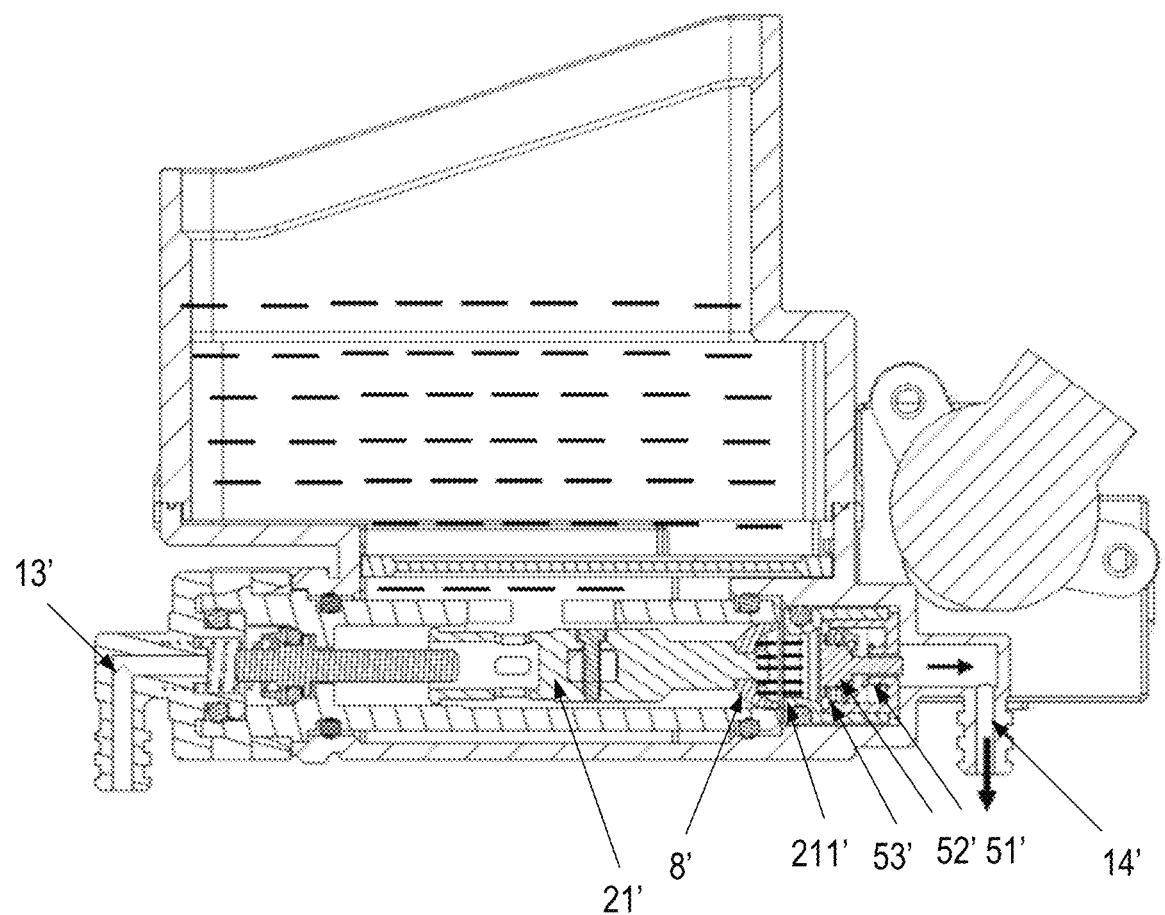
FIG. 21 is a schematic diagram of the state when the cleaning function is started in the embodiment of the present disclosure that uses a leather bowl as the liquid suction chamber valve device.

FIG. 20 is a schematic diagram of the state when the product flow water enters the storage box of the liquid supply device during the cleaning initialization in the embodiment of the present disclosure that uses a leather bowl as the liquid suction chamber valve device; FIG. 21 is a schematic diagram of the state when the cleaning function is started in the embodiment of the present disclosure that uses a leather bowl as the liquid suction chamber valve device. As shown in FIGS. 20 to 21, in one of the embodiments, the liquid suction chamber valve device 6' comprises a leather bowl 63' sleeved on the piston rod 21', the bottom of the leather bowl 63' is sleeved on the end of the piston rod 21' close to the liquid suction chamber 211', the mouth of the leather bowl 63' faces the liquid outlet of the liquid suction chamber 211'.

Specifically, in this embodiment, a small leather bowl 63' is assembled on the right end of the piston rod 21'. Using the principle of vacuum inside the liquid suction chamber 211', when the piston rod 21' moves to the left, the volume of the liquid suction chamber 211' increases and negative pressure is generated. Thus the detergent saturated solution in the detergent storage box 1' can be sucked into the liquid suction chamber 211' from the gap between the outer edge of the small leather bowl 63' and the inner wall of the piston assembly sleeve 22'. When the piston rod 21' moves to the right, the pressure of the solution inside the liquid suction chamber 211' increases. The small leather bowl 63' will expand under pressure, so it seals the gap between its outer edge and the inner wall of the piston assembly sleeve 22'. Then the detergent saturated solution inside will open the valve core of the output end check valve 5' at the right end under pressure, and flow out of the detergent saturated solution output end 14' and mix with the product inflow water to form a detergent mixed solution.

In this embodiment, a leather bowl is used to form the liquid suction chamber valve device 6', which reduces the friction between the sealing ring and the inner wall of the piston tube when the piston assembly reciprocates, and finally simplifies the structure.

In one of the embodiments, the detergent space 11' and the piston space 12' are separated by an isolation screen 7'.

In this embodiment, the inner chamber of the detergent storage box 1' is divided into the detergent space 11' and the piston space 12' by the detergent isolation screen 7', so as to prevent the detergent particles from blocking the piston space 12'.

In one of the embodiments, the liquid supply device for an electronic toilet further comprises a side water pipe 8' connecting the water inlet end 13' and the detergent saturated solution output end 14'.

In this embodiment, a side water pipe 8' is set. During normal flushing, the water inlet end check valve 4' at the front of the liquid supply device and the output end check valve 5' at the rear of the liquid supply device are all in the closed state. The product inflow water flows through the side water pipe 8' connecting the water inlet end 13' at the front and the detergent saturated solution output end 14' at the rear and then flows through the subsequent components.

In one of the embodiments, the detergent storage box 1' has an upper opening communicating with the detergent space 11', the piston space 12' is arranged at the bottom of the detergent space 11'.

The detergent storage box 1' of this embodiment does not bear pressure. The upper opening of the detergent storage box 1' doesn't need to bear the water pressure of the internal water channels, so there is no need to consider the limitation of the size and the shape of the opening for adding the detergent because of the need of the sealing structure corresponding to the pressure bearing. So the detergent storage box 1' can provide an opening with larger size that can better correspond to the product's appearance and internal structure to facilitate the user's operation of adding detergent particles. At the same time, since the upper part of the liquid supply device is an open opening, the internal space of the detergent storage box 1' is not under pressure. On the one hand, this solves the problem that the upper cover of the liquid supply device may be opened or closed with difficulty due to the need to seal each part of the liquid supply device; on the other hand, since the detergent storage box 1' is an unsealed space, no excess air is condensed inside, thereby increasing the effective storage space of the detergent.

An electronic toilet liquid supply system of an embodiment of the present disclosure may comprise: an electronic toilet and the liquid supply device as mentioned previously; the electronic toilet includes a toilet body and a pipe housed in the toilet body; the toilet body is provided with a product water inflow switch solenoid valve for controlling the connection or disconnection with the external water supply system, the water inlet end 13' of the liquid supply device is connected to a product water inlet, the detergent saturated solution output end 14' of the liquid supply device is connected to one end of the pipe, the other end of the pipe is provided with a water outlet device.

Figure 22:
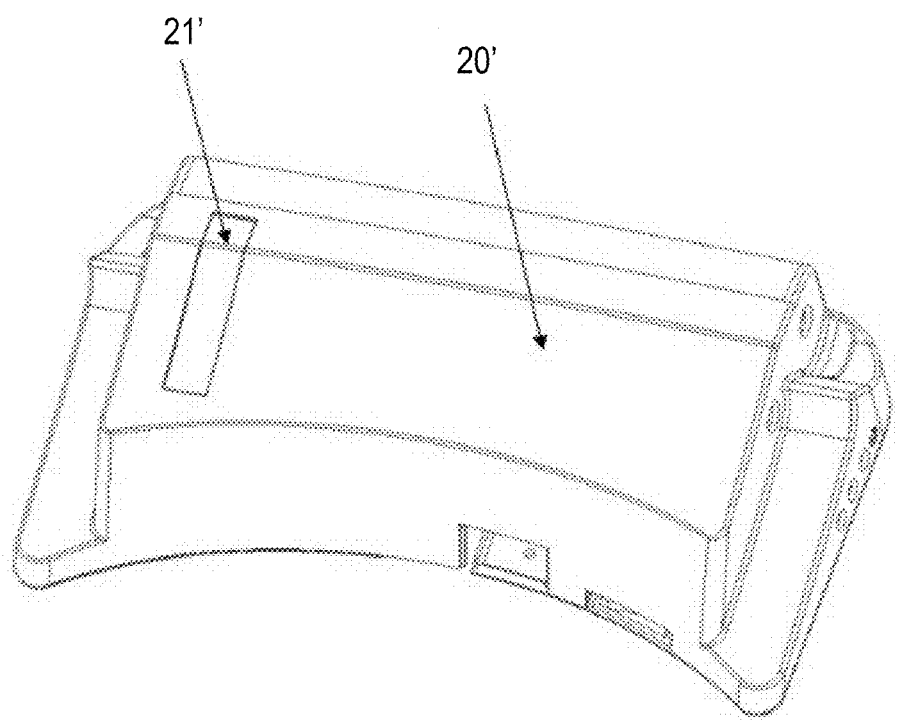
FIG. 22 is a schematic diagram of the liquid supply device assembled on the product main cover with the upper cover of the liquid supply device closed.
Figure 23:
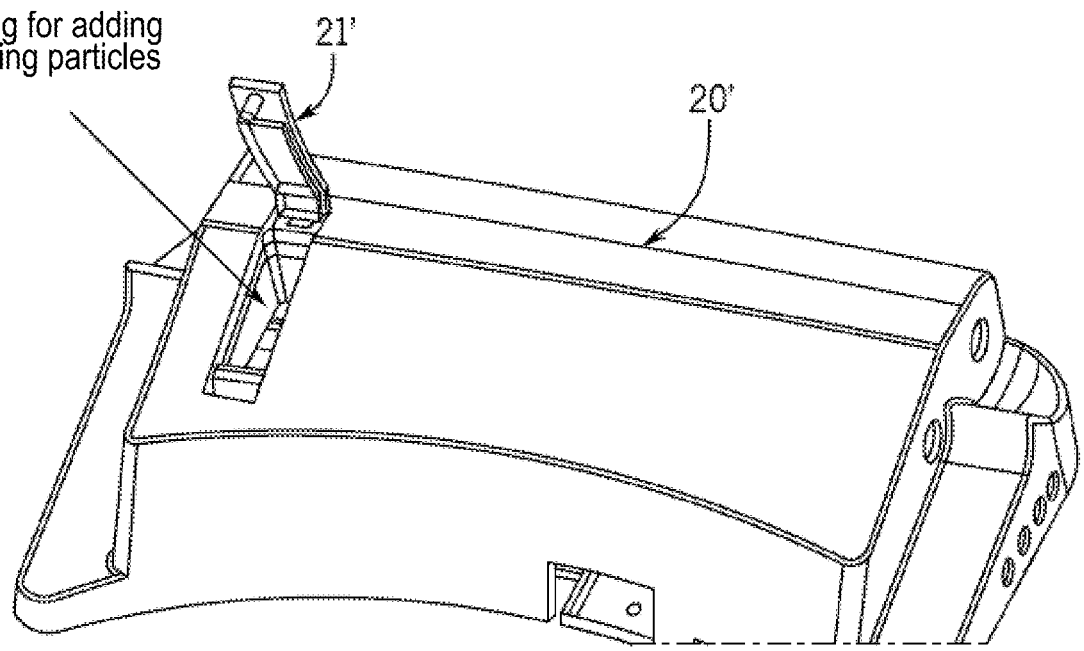
FIG. 23 is a schematic diagram of the upper cover of the liquid supply device being opened to add detergent.

Specifically, the liquid supply device of the electronic toilet is connected to the electronic toilet itself. FIG. 22 is a schematic diagram of the liquid supply device assembled on the product main cover with the upper cover of the liquid supply device closed; FIG. 23 is a schematic diagram of the upper cover of the liquid supply device being opened to add detergent. FIGS. 22 and 23 show the position where the liquid supply device is assembled on the product main cover 20' and the state of the upper cover of the liquid supply device being closed and opened to add detergent. The water from the external water supply system enters the water inlet end 13' of the liquid supply device through product water inlet switch solenoid valve. When cleaning is needed, the water inlet end check valve 4' opens, and the water from the external water supply system enters through the product water inlet switch solenoid valve into one end of the pipe. Due to the opening of the water inlet end check valve 4', part of the clean water passing through the water inlet end 13' will flow into the detergent storage box 1'. And by setting the opening time, an appropriate amount of water is stored in the detergent storage box 1', so as to effectively contact the detergent stored in the detergent space 11'. When the amount of water entering the detergent storage box 1' reaches the required amount, the piston rod 21' moves rightward to the initial position under the action of the driving mechanism 3', and the water inlet end check valve 4' closes the water inflow. The output end check valve 5' provided at the detergent saturated solution output end 14' at the rear of the liquid supply device can, on the one hand, prevent the saturated solution formed in the detergent storage box 1' from leaking into the product pipes when the cleaning program is initialized. On the other hand, when the cleaning function is turned on, when the piston rod 21' pushes the detergent saturated solution, the output end check valve 5' can be opened under the action of the solution pressure, the detergent saturated solution enters the product pipe, and enters the water outlet device from the other end of the pipe. The water outlet device includes a flow meter, a direct heating heater, a vacuum breaker, a distributor, and a spray nozzle. The spray nozzle may include a front-wash spray nozzle and a rear-wash spray nozzle. If the detergent is a descaling agent, user can choose to use the rear-wash spray nozzle to clean the electronic toilet. If the detergent is a disinfectant cleaning agent used for cleaning and care, such as a feminine cleaning agent, user can choose to use the front-wash spray nozzle for feminine care.

In an embodiment, when the water inlet end check valve 4' is closed, the inflow water can flow through the side water pipe 8' and directly enter one end of the pipe via the detergent saturated solution output end 14', and then enter the water outlet device from the other end of the pipe. The water outlet device includes a flow meter, a direct heating heater, a vacuum breaker, a distributor, and a spray nozzle.

The liquid supply device provided by the present disclosure controls the opening or closing of the check valve inside the liquid supply device by means of the action of the driving mechanism and the piston rod, without the need for an additional pump to push or suck, and it is suitable for most electronic toilets without internal water tank and pump. In the meanwhile, because the overall structure is compact, the size and shape of the opening can be freely defined according to the installation position and space structure of the liquid supply device for product design, without the restriction of the size and shape of the opening and the need for a complicated sealing and locking mechanism.

Figure 24:
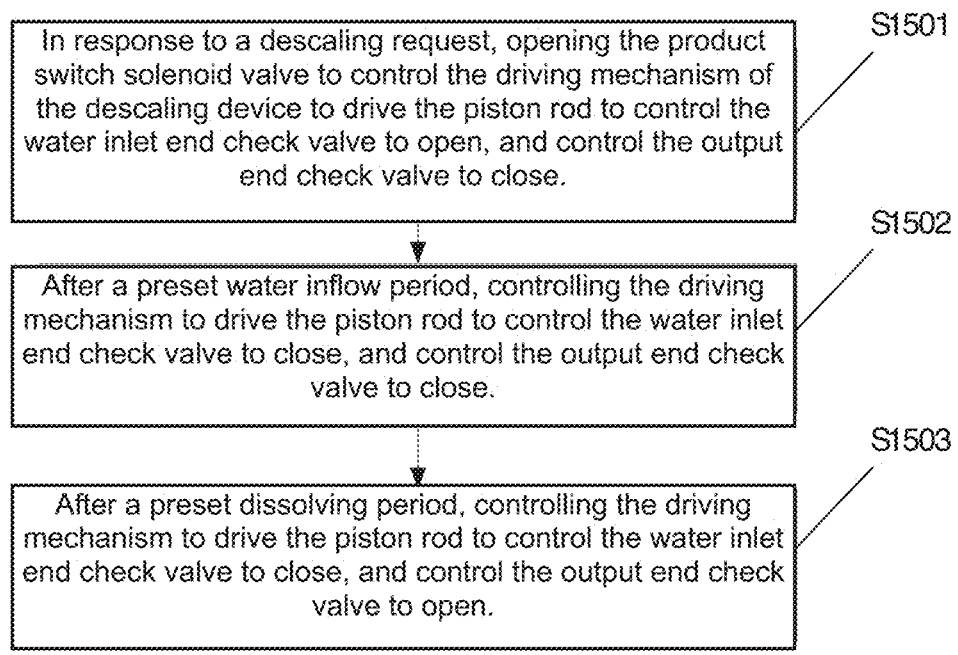
FIG. 24 is a working flow chart of a cleaning method for an electronic toilet cleaning system of the present disclosure.

FIG. 24 is a working flow chart of a cleaning method for an electronic toilet cleaning system of the present disclosure. As shown in FIG. 24, a cleaning method of an electronic toilet cleaning system of the present disclosure as mentioned previously may comprises:

step S1501, in response to a cleaning request, opening the product switch solenoid valve to control the driving mechanism 3' of the liquid supply device to drive the piston rod 21' to control the water inlet end check valve 4' to open, and control the output end check valve 5' to close;

step S1502, after a preset water inflow period, controlling the driving mechanism 3' to drive the piston rod 21' to control the water inlet end check valve 4' to close, and control the output end check valve 5' to close;

step S1503, after a preset dissolving period, controlling the driving mechanism 3' to drive the piston rod 21' to control the water inlet end check valve 4' to close, and control the output end check valve 5' to open.

The liquid supply device provided by the present disclosure controls the opening or closing of the check valve inside the liquid supply device by means of the action of the driving mechanism and the piston rod, without the need for an additional pump to push or suck, and it is suitable for most electronic toilets without internal water tank and pump.

In the meanwhile, because the overall structure is compact, the size and shape of the opening can be freely defined according to the installation position and space structure of the liquid supply device for product design, without the restriction of the size and shape of the opening and the need for a complicated sealing and locking mechanism.

Finally, because the dissolution time is set, the detergent particles can be fully dissolved.

In one of the embodiments, a liquid suction chamber 211' is provided between the piston rod 21' and the output end check valve 5'; the liquid suction chamber 211' is provided with a liquid suction chamber valve device 6', the opening or closing of the liquid suction chamber valve device 6' controls the connection or separation of the liquid inlet of the liquid suction chamber 211' and the detergent space 11'; the opening or closing of the output end check valve 5' controls the connection or separation of the liquid inlet of the liquid suction chamber 211' and the detergent saturated solution output end 14'.

the piston rod 21' is driven by the driving mechanism 3' to perform a water inflow action, a dissolving action, a liquid suction action and a liquid discharge action in the piston space 12', wherein:

the water inflow action is a movement of first stroke distance from the detergent saturated solution output end 14' to the water inlet end 13', when the piston rod 21' performs the water inflow action, the water inlet check valve 4' is opened, the output end check valve 5' is closed, and the liquid suction chamber valve device 6' is closed;

the dissolving action is a movement of first stroke distance from the water inlet end 13' to the detergent saturated solution output end 14'; when the piston rod 21' performs the dissolving action, the water inlet end check valve 4' is closed, the output end check valve 5' is closed, and the liquid suction chamber valve device 6' is closed;

the liquid suction action is a movement of second stroke distance from the detergent saturated solution output end 14' to the water inlet end 13', the second stroke distance is less than the first stroke distance; when the piston rod 21' performs the liquid suction action, the water inlet end check valve 4' is closed, the output end check valve 5' is closed, and the liquid suction chamber valve device 6' is opened;

the liquid discharge action is a movement of second stroke distance from the water inlet end 13' to the detergent saturated solution output end 14', the second stroke distance is less than the first stroke distance; when the piston rod 21' performs the liquid discharge action, the water inlet end check valve 4' is closed, the output end check valve 5' is opened, and the liquid suction chamber valve device 6' is closed.

Said in response to a cleaning request, opening the product switch solenoid valve to control the driving mechanism 3' of the liquid supply device to drive the piston rod 21' to control the water inlet end check valve 4' to open, and control the output end check valve 5' to close specifically comprises:

in response to the cleaning request, opening the product switch solenoid valve to control the driving mechanism 3' of the liquid supply device to drive the piston rod 21' to perform the water inflow action.

Said after a preset water inflow period, controlling the driving mechanism 3' to drive the piston rod 21' to control the water inlet end check valve 4' to close, and control the output end check valve 5' to close specifically comprises:

after a preset water inflow period, controlling the driving mechanism 3' to drive the piston rod 21' to perform the dissolving action.

Said after a preset dissolving period, controlling the driving mechanism 3' to drive the piston rod 21' to control the water inlet end check valve 4' to close, and control the output end check valve 5' to open specifically comprises:

after a preset dissolving period, controlling the driving mechanism 3' to drive the piston rod 21' to perform a plurality of groups of liquid suction actions and liquid discharge actions.

In this embodiment, the piston rod 21' reciprocates multiple times continuously, thereby continuously squeezes out the detergent saturated solution to mix the detergent saturated solution with the product running water in a certain proportion to achieve cleaning purpose, such as descaling or feminine care.

As the best embodiment of the present disclosure, the liquid supply device for an electronic toilet is composed by a detergent storage box 1' with an opening on the upper part, a piston assembly 2', a driving mechanism 3', an isolation screen 7' of detergent, an openable water inlet end check valve 4' arranged at the water inlet end 13' at the front, and a side water pipe 8' which can directly connect the water inlet end 13' at the front and the detergent saturated solution output end 14' at the rear.

The inner space of the detergent storage box 1' is divided by an isolation screen 7' of detergent into an upper detergent space 11' and a lower piston space 12'. The upper detergent space 11' has an opening for adding detergent through the opening and storing the detergent, the lower piston space 12' is used to set the piston assembly 2 and the rack driving arm 32' of the driving mechanism 3'. The driving mechanism 3' includes a driving motor 31' arranged at the rear end of the detergent storage box 1' and a rack driving arm 32' arranged in the piston space 12'. One end of the rack driving arm 32' meshes with the driving gear 33' of the driving motor 31', the other end is connected with the piston rod 21'.

The openable water inlet end check valve 4' arranged at the water inlet end 13' is, on the one hand, to prevent the product water from flowing into the liquid supply device when the normal flushing function of the product is turned on. On the other hand, since a valve core rod 422' is provided on one side of the water inlet end check valve core 42', the valve core rod 422' is a long rod, which is used to, when the liquid supply device is turned on for initialization, drive the piston rod 21' of the driving assembly 2' to move forward for a first stroke distance by the driving motor 31' of the driving mechanism 3', make the piston rod 21' contact the valve core rod 422' and push the valve core head 421' to open the water inlet end check valve core 42', so that a part of the product inflow water can flow into the detergent storage box 1'. And by setting the opening time, an appropriate amount of water is allowed to be stored in the box to effectively contact the stored detergent in the detergent space 11'. When the amount of water entering the detergent storage box 1' reaches the required amount, the piston rod 21' moves to the right for the first stroke distance under the action of the driving motor 31' of the driving mechanism 3' and returns to the initial position. The water inlet end check valve core 42' moves to the right under the action of the reverse force of the water inlet end check valve spring 41' and closes the water inflow. The output end check valve 5' provided at the detergent saturated solution output end 14' at the rear of the cleaning device can, on the one hand, prevent the saturated solution formed in the detergent storage box 1' from leaking into the product pipes when the cleaning program is initialized. On the other hand, when the cleaning function is turned on, when the piston rod 21' pushes the detergent saturated solution, under the action of the solution pressure, the output end check valve 5' can be opened to inject the detergent saturated solution into the flowing water inside the product. An overflow hole and an overflow side pipe 15' are provided on the side of the detergent storage box 1'. When the liquid supply device is initialized, if too much water enters the detergent storage box 1', or the front-end check valve fails, excessive inflow water can be discharged from the overflow side pipe 15' to the product base and flow into the ceramic bowl part of the electronic toilet.

The piston assembly 2' of the liquid supply device comprises a piston rod 21', a piston rod sealing ring 215', a liquid suction sealing heading ball 61', and a liquid suction sealing spring 62'. The liquid suction sealing heading ball 61' is a small steel ball. The piston assembly 2' also includes a piston assembly sleeve 22'. The piston rod 21', the piston rod sealing ring 215', the liquid suction sealing heading ball 61', and the liquid suction sealing spring 62' are housed in the piston assembly sleeve 22'. The piston rod 21' is a cylinder with a hollow structure at both ends. The hollow structure at the left end of the piston rod 21' is the valve core rod chamber 212' which is used to accommodate the valve core rod 422' of the water inlet end check valve 4'. The valve core rod chamber 212' has a valve core rod chamber wall through hole 213' on the circumference to facilitate water inflow. The hollow structure at the right end is the liquid suction chamber 211' which is used for accommodating the liquid suction sealing heading ball 61' and the liquid suction sealing spring 62' to form a combination structure similar to a check valve that can be opened and closed. A small square groove 214' is provided in the middle of the side surface of the piston rod 21' for fixing the rack driving arm 32'. The rack driving arm 32' is driven by the matching driving gear 33' and the driving motor 31' at the rear to drive the piston assembly to move back and forth in the piston assembly sleeve 22'.

The hollow structure at the right end of the piston rod 21' accommodates the liquid suction sealing heading ball 61', the liquid suction sealing spring 62', and the piston rod sealing ring 215' which are combined to form a combination structure similar to a check valve, and forms a sealed space as the liquid suction chamber 211' together with the output end check valve 5' arranged at the detergent saturated solution output end 14' on the right side. When the product completes the cleaning initialization program and starts the cleaning function, the piston rod 21' of the piston assembly moves forward under the push of the driving motor 31' and the rack driving arm 32'. The liquid suction chamber 211' generates a negative pressure as the piston rod 21' moves to the left and the space increases, so as to suck the liquid suction sealing heading ball 61' to the right. And because the pressure of the liquid suction sealing spring 62' decreases with the lengthening of the space distance, the liquid suction sealing heading ball 61' can move to the right, so that a gap between the liquid suction sealing heading ball 61' and the matching sealing slopes of the liquid inlet of the liquid suction chamber 211' will be formed, and the detergent saturated solution will be sucked into the enlarged liquid suction chamber 211'. When the piston rod 21' moves to the right under the action of the driving motor 31' and the rack driving arm 32', the liquid suction sealing heading ball 61' will move to the left and block and close the liquid inlet of the liquid suction chamber 211' under the reaction of the liquid suction sealing spring 62'. At the same time, due to the compression of the space of the liquid suction chamber 211', the internal pressure transfers to the right and will open the output end check valve 5' at the right end. Then the saturated detergent solution is squeezed into the product inflow water and mixed into a detergent mixed solution. Since the amount of detergent saturated solution squeezed out by the piston each time the piston reciprocates is limited, it can be controlled by a program. When the cleaning function is turned on, the piston assembly reciprocates multiple times continuously, thereby continuously squeeze out the detergent saturated solution to mix the detergent saturated solution with the product running water in a certain proportion to achieve cleaning purpose, such as descaling or feminine care.

When the cleaning function of the product is not turned on and the product is in normal flushing, the water inlet end check valve 4' at the front of the liquid supply device and the output end check valve 5' at the rear of the liquid supply device are all in the closed state. The product inflow water flows through the side water pipe 8' connecting the water inlet end 13' at the front and the detergent saturated solution output end 14' at the rear and then flows through the subsequent components.

The cleaning process of the product can be performed by continuously allowing the detergent mixed solution to flow through the product internal component pipes and out of the spray nozzle hole, such as descaling or feminine care. It can also be performed by storing the detergent saturated solution in the space formed in the product internal component pipes for a certain period of time to descale. Because the volume of the pipe formed by the internal components of the product is small, and the detergent saturated solution is mixed with the product inflow water in a certain proportion, the amount of the detergent saturated solution required for each time is small. Therefore, this can also achieve the objective that the user can add a detergent one time, and perform multiple cleanings as needed in the subsequent use of the product, such as descaling or feminine care.

As shown in FIGS. 20 and 21, in order to simplify the structural design and reduce the friction between the sealing ring and the inner wall of the piston tube during the reciprocating movement of the piston assembly, the small steel ball, the spring and the peripheral sealing ring assembled in the chamber at the right end of the piston rod 21' can also be eliminated. The right end of the piston rod 21' can be assembled with the small leather bowl 63' directly.

As shown in FIG. 20, using the principle of vacuum inside the liquid suction chamber 211', when the piston rod 21' moves to the left, the volume of the liquid suction chamber 211' increases and negative pressure is generated. Thus the detergent saturated solution in the detergent storage box 1' can be sucked into the liquid suction chamber 211' from the gap between the outer edge of the small leather bowl 63' and the inner wall of the piston assembly sleeve 22'. As shown in FIG. 21, when the piston rod 21' moves to the right, the pressure of the solution inside the liquid suction chamber 211' increases. The small leather bowl 63' will expand under pressure, so it seals the gap between its outer edge and the inner wall of the piston assembly sleeve 22'. Then the detergent saturated solution inside will open the valve core of the output end check valve 5' at the right end under pressure, and flow out of the detergent saturated solution output end 14' and mix with the product inflow water to form a detergent mixed solution.

The above-mentioned embodiments only express several implementation modes of the present disclosure, and the description is relatively specific and detailed, but it should not be understood as a limitation to the patent scope of the present disclosure. It should be pointed out that for those of ordinary skill in the art, without departing from the concept of the present disclosure, several modifications and improvements can also be made, and these all should fall within the protection scope of the present disclosure. Therefore, the protection scope of the present disclosure patent should be subject to the appended claims.

I claim:

1. A liquid supply device for an electronic toilet, the liquid supply device comprising:
a detergent storage box, comprising:
a detergent space configured to house a detergent; and
a piston space configured to house a piston assembly and in communication with the detergent space;
the piston assembly comprising a piston rod configured for a reciprocating movement in the piston space;
a driving mechanism configured to drive the piston rod to reciprocally move in the piston space,
wherein a water inlet end check valve is disposed at a water inlet end of the piston space and the reciprocating movement of the piston rod in the piston space controls an opening or a closing of the water inlet end check valve, and
wherein an output end check valve is disposed at a detergent saturated solution output end of the piston space and the reciprocating movement of the piston rod in the piston space controls an opening or a closing of the output end check valve, and
a liquid suction chamber disposed between the piston rod and the output end check valve; and
a liquid suction chamber valve device disposed at the liquid suction chamber, wherein the reciprocating movement of the piston rod in the piston space controls an opening or a closing of the liquid suction chamber valve device.

2. The liquid supply device for the electronic toilet according to claim 1,
wherein the liquid suction chamber valve device comprises:
a liquid suction sealing heading bead disposed at a liquid inlet of the liquid suction chamber; and
a liquid suction sealing spring, comprising:
a first end configured to press against the output end check valve; and
a second end configured to press against the liquid suction sealing heading bead,
wherein under a liquid suction action, the liquid suction sealing heading bead opens the liquid inlet of the liquid suction chamber, and
wherein under a water inflow action, a dissolving action, or a liquid discharge action, the liquid suction sealing heading bead closes the liquid inlet of the liquid suction chamber.

3. The liquid supply device for the electronic toilet according to claim 1,
wherein the liquid suction chamber valve device comprises a leather bowl covering the piston rod,
wherein a bottom of the leather bowl covers an end, close to the liquid suction chamber, of the piston rod, and
wherein a mouth of the leather bowl faces a liquid outlet of the liquid suction chamber.

4. The liquid supply device for the electronic toilet according to claim 1,
wherein the opening or the closing of the water inlet end check valve controls a communication or a separation of the water inlet end and the detergent space, wherein the opening or the closing of the output end check valve controls a connection or a separation of the detergent saturated solution output end and the detergent space and controls a connection or a separation of a liquid outlet of the liquid suction chamber and the detergent saturated solution output end, and wherein the opening or the closing of the liquid suction chamber valve device controls a connection or a separation of a liquid inlet of the liquid suction chamber and the detergent space.

5. The liquid supply device for the electronic toilet according to claim 4, wherein the piston rod is driven by the driving mechanism to perform a water inflow action, wherein the water inflow action is a movement of the piston rod, at a first stroke distance, from the detergent saturated solution output end to the water inlet end, and wherein when the piston rod performs the water inflow action, the water inlet end check valve is opened, the output end check valve is closed, and the liquid suction chamber valve device is closed.

6. The liquid supply device for the electronic toilet according to claim 5, wherein the piston rod is driven by the driving mechanism to perform a liquid suction action, wherein the liquid suction action is a movement of the piston rod, at a second stroke distance, from the detergent saturated solution output end to the water inlet end, wherein the second stroke distance is less than the first stroke distance, and wherein when the piston rod performs the liquid suction action, the water inlet end check valve is closed, the output end check valve is closed, and the liquid suction chamber valve device is opened.

7. The liquid supply device for the electronic toilet according to claim 4, wherein the piston rod is driven by the driving mechanism to perform a dissolving action, wherein the dissolving action is a movement of the piston rod, at a first stroke distance, from the water inlet end to the detergent saturated solution output end, and wherein when the piston rod performs the dissolving action, the water inlet end check valve is closed, the output end check valve is closed, and the liquid suction chamber valve device is closed.

8. The liquid supply device for the electronic toilet according to claim 7, wherein the piston rod is driven by the driving mechanism to perform a liquid discharge action, wherein the liquid discharge action is a movement of the piston rod, at a second stroke distance, from the water inlet end to the detergent saturated solution output end, wherein the second stroke distance is less than the first stroke distance, and wherein when the piston rod performs the liquid discharge action, the water inlet end check valve is closed, the output end check valve is opened, and the liquid suction chamber valve device is closed.

9. The liquid supply device for the electronic toilet according to claim 4, wherein the piston assembly further comprises a piston assembly sleeve comprising a sleeve chamber configured to house the piston rod, wherein a sleeve through hole is disposed on a chamber wall of the sleeve chamber and is in communication with the detergent space, wherein the water inlet end check valve is disposed outside the sleeve chamber, and the opening or the closing of the water inlet end check valve controls a connection or a separation of the water inlet end and the sleeve chamber, and wherein the output end check valve is disposed outside the sleeve chamber, and the opening or closing of the output end check valve controls a connection or a separation of the detergent saturated solution output end and the sleeve chamber.

10. The liquid supply device for the electronic toilet according to claim 9, wherein the output end check valve comprises:
an output end check valve core; and
an output end check valve spring disposed outside the liquid suction chamber and comprising:
a first end fixed to the detergent saturated solution output end; and
a second end configured to press against the output end check valve core;

wherein under a liquid discharge action, the output end check valve core opens the detergent saturated solution output end, and wherein under a water inflow action, a dissolving action, or a liquid suction action, the output end check valve core closes the detergent saturated solution output end.

11. The liquid supply device for the electronic toilet according to claim 9, wherein the water inlet end check valve comprises:
a water inlet check valve core, comprising:
a valve core head; and
a valve core rod configured to be inserted into the sleeve chamber; and
a water inlet check valve spring disposed outside the sleeve chamber and comprising:
a first end fixed to the water inlet end; and
a second end configured to press against the valve core head of the water inlet check valve core, wherein under a water inflow action, the piston rod contacts the valve core rod and drives the valve core head to open the sleeve chamber, and wherein under a dissolving action, a liquid suction action, or a liquid discharge action, the piston rod and the valve core rod are separated, and the valve core head resets and closes the sleeve chamber.

12. The liquid supply device for the electronic toilet according to claim 11, wherein an end, close to the water inlet end check valve, of the piston rod comprises a valve core rod chamber configured to accommodate the valve core rod, and wherein a valve core rod chamber wall through hole is disposed on a chamber wall of the valve core rod chamber and is in communication with the sleeve through hole.

13. A cleaning method by using a liquid supply device for an electronic toilet, the liquid supply device, comprising:
a detergent storage box, comprising:
a detergent space configured to house a detergent; and
a piston space configured to house a piston assembly and in communication with the detergent space;
the piston assembly comprising a piston rod configured for a reciprocating movement in the piston space; and
a driving mechanism configured to drive the piston rod to reciprocally move in the piston space, the cleaning method comprising:
- in response to a cleaning request, controlling the driving mechanism of the liquid supply device to drive the piston rod to open a water inlet end check valve and close the output end check valve;
- after a preset water inflow period has passed, controlling the driving mechanism to drive the piston rod to close the water inlet end check valve and close the output end check valve;
- after a preset dissolving period has passed, controlling the driving mechanism to drive the piston rod to close the water inlet end check valve to close and open the output end check valve.

14. The cleaning method according to claim 13, the liquid supply device, further comprising a liquid suction chamber valve device disposed at a liquid suction chamber, the liquid suction chamber disposed between the piston rod and the output end check valve, the method further comprising:
- performing a water inflow action by the driving mechanism to move the piston rod, at a first stroke distance, from the detergent saturated solution output end to the water inlet end; and
- performing a liquid suction action by the driving mechanism to move the piston rod, at a second stroke distance, from the detergent saturated solution output end to the water inlet end, wherein when the piston rod performs the water inflow action, the water inlet end check valve is opened, the output end check valve is closed, and the liquid suction chamber valve device is closed, wherein the second stroke distance is less than the first stroke distance, and wherein when the piston rod performs the liquid suction action, the water inlet end check valve is closed, the output end check valve is closed, and the liquid suction chamber valve device is opened.

15. The cleaning method according to claim 13, the liquid supply device, further comprising a liquid suction chamber valve device disposed at a liquid suction chamber, the liquid suction chamber disposed between the piston rod and the output end check valve, the method further comprising:
- performing a dissolving action by the driving mechanism to move the piston rod, at a first stroke distance, from the water inlet end to the detergent saturated solution output end; and
- performing a liquid discharge action by the driving mechanism to move the piston rod, at a second stroke distance, from the water inlet end to the detergent saturated solution output end, wherein when the piston rod performs the dissolving action, the water inlet end check valve is closed, the output end check valve is closed, and the liquid suction chamber valve device is closed, wherein the second stroke distance is less than the first stroke distance, and wherein when the piston rod performs the liquid discharge action, the water inlet end check valve is closed, the output end check valve is opened, and the liquid suction chamber valve device is closed.

16. A toilet comprising:
a liquid supply device, the liquid supply device comprising:
- a detergent storage box, comprising:
  - a detergent space configured to house a detergent; and
  - a piston space configured to house a piston assembly and in communication with the detergent space;
- the piston assembly comprising a piston rod configured for a reciprocating movement in the piston space;
- a driving mechanism configured to drive the piston rod to reciprocally move in the piston space,
wherein a water inlet end check valve is disposed at a water inlet end of the piston space and the reciprocating movement of the piston rod in the piston space controls an opening or a closing of the water inlet end check valve, and
wherein an output end check valve is disposed at a detergent saturated solution output end of the piston space and the reciprocating movement of the piston rod in the piston space controls an opening or a closing of the output end check valve, and
- a liquid suction chamber disposed between the piston rod and the output end check valve; and
- a liquid suction chamber valve device disposed at the liquid suction chamber, wherein the reciprocating movement of the piston rod in the piston space controls an opening or a closing of the liquid suction chamber valve device.

* * * * *